United States Patent
Lopez

(10) Patent No.: US 10,063,394 B2
(45) Date of Patent: Aug. 28, 2018

(54) METHOD FOR ESTIMATING A CHANNEL, AND NETWORK NODE

(71) Applicant: Telefonaktiebolaget LM Ericsson (publ), Stockholm (SE)

(72) Inventor: Miguel Lopez, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 230 days.

(21) Appl. No.: 15/128,728

(22) PCT Filed: Mar. 26, 2014

(86) PCT No.: PCT/EP2014/056015
§ 371 (c)(1),
(2) Date: Sep. 23, 2016

(87) PCT Pub. No.: WO2015/144215
PCT Pub. Date: Oct. 1, 2015

(65) Prior Publication Data
US 2017/0104610 A1    Apr. 13, 2017

(51) Int. Cl.
*H04L 25/02* (2006.01)
*H04L 5/00* (2006.01)
*H04W 88/08* (2009.01)

(52) U.S. Cl.
CPC ........ *H04L 25/0204* (2013.01); *H04L 5/0007* (2013.01); *H04L 25/0218* (2013.01); *H04W 88/08* (2013.01); *H05K 999/99* (2013.01)

(58) Field of Classification Search
CPC ............. H04L 25/0218; H04L 25/0216; H04L 25/022; H04L 25/0204; H04L 5/0007; H04W 88/08
See application file for complete search history.

(56) References Cited

U.S. PATENT DOCUMENTS

| 2005/0113142 | A1* | 5/2005 | Felter | H04B 1/709 455/562.1 |
| 2005/0117675 | A1* | 6/2005 | Das | H04B 7/086 375/343 |

(Continued)

FOREIGN PATENT DOCUMENTS

EP    2367329 A1    9/2011

OTHER PUBLICATIONS

Song, B., et al., "Blind estimation of SIMO Channels Using a Tensor-Based Subspace Method", 2010 44th Asilomar Conference on Signals, Systems and Computers—Nov. 7-10, 2010—Pacific Grove, CA, IEEE, Piscataway, NJ, USA, Nov. 7, 2010 (Nov. 7, 2010) pp. 8-12, XP031860536.

(Continued)

*Primary Examiner* — Awet Haile
(74) *Attorney, Agent, or Firm* — Sage Patent Group

(57) ABSTRACT

The disclosure relates to a method (60) performed in a network node (2) for estimating a channel. The network node (2) controls an antenna array (3) comprising a number N of antennas (51, . . . , 5N) in one or more spatial dimensions. The network node (2) comprises a receiver (72) receiving signals from the antenna array (3). The method (60) comprises: obtaining (61) matched filter channel estimates for each sub-carrier and antenna of a signal received by the antennas (51, . . . , 5N), the signal comprising a number K of frequency sub-carriers; arranging (62) the obtained matched filter channel estimates in a first multi-dimensional array, wherein time or frequency domain samples of the matched filter channel estimates are arranged along a first dimension and wherein a second dimension is a first spatial dimension of the number N of antennas, wherein the matched filter channel estimates are ordered in the first multi-dimensional array such as to reflect the physical location in space of the antennas (51, . . . , 5N);

(Continued)

applying (63) an orthogonal transform to the first multi-dimensional array, providing a second multi-dimensional array; de-noising (64) the second multi-dimensional array, providing a third multi-dimensional array; applying (65) the inverse of the orthogonal transform to the third multi-dimensional array, providing channel estimates for all branches of the receiver (72). The disclosure also relates to corresponding network node, computer program and computer program products.

20 Claims, 13 Drawing Sheets

(56) References Cited

U.S. PATENT DOCUMENTS

2011/0274187 A1* 11/2011 Huang ............... H04L 25/0216
375/260
2012/0320956 A1* 12/2012 Sorrentino ............ H04L 5/0023
375/219

OTHER PUBLICATIONS

International Search Report and Written Opinion dated Jan. 19, 2015 in International application No. PCT/EP2014/056015, 8 pages.

* cited by examiner

METHOD FOR ESTIMATING A CHANNEL, AND NETWORK NODE

CROSS-REFERENCE TO RELATED APPLICATION(S)

This application is a 35 U.S.C. § 371 National Phase Entry Application from PCT/EP2014/056015, filed Mar. 26, 2014, and designating the United States.

TECHNICAL FIELD

The technology disclosed herein relates generally to the field of channel estimation, and in particular to channel estimation of large antenna arrays.

BACKGROUND

Antenna arrays with many antenna ports are part of a promising technology with many potential applications in wireless communication. Such antenna arrays are for example relevant in current 4G and future 5G systems which are based on Orthogonal Frequency Division Multiplexing (OFDM) or variants thereof, such as for instance Single-Carrier Frequency Division Multiple Access (SC-FDMA).

A typical linear or planar antenna array consists of many closely spaced antennas, each antenna comprising a number of antenna elements. Because of the close spacing, signals received at neighboring antennas are often highly correlated. Likewise, samples of the received signal which are closely spaced in the frequency domain are also often highly correlated.

If the number of antenna ports increases, while maintaining the number of antenna elements constant, the Signal to Noise Ratio (SNR) in each antenna port of the antenna array decreases due to loss in antenna array gain. This in turn entails a degradation of channel estimates, which is a key for obtaining good uplink (UL) performance. Also, increasing both the number of antenna elements and antenna ports makes it possible to receive weaker signals as more signal energy can be collected, but the channel estimate has to be maintained accurate; else the use of more antennas will not improve the user experience. There is thus a need for improving channel estimates for large antenna arrays, having a large number of closely spaced antennas.

SUMMARY

An object of the present teachings is to solve or at least alleviate at least one of the above mentioned problems.

The object is according to a first aspect achieved by a method performed in a network node for estimating a channel. The network node controls an antenna array comprising a number of antennas in one or more spatial dimensions. The network node comprises a receiver receiving signals from the antenna array. The method comprises: obtaining matched filter channel estimates for each sub-carrier and antenna of a signal received by the antennas, the signal comprising a number of frequency sub-carriers; arranging the obtained matched filter channel estimates in a first multi-dimensional array, wherein time or frequency domain samples of the matched filter channel estimates are arranged along a first dimension and wherein a second dimension is a first spatial dimension of the number of antennas, wherein the matched filter channel estimates are ordered in the first multi-dimensional array such as to reflect the physical location in space of the antennas; applying an orthogonal transform to the first multi-dimensional array, providing a second multi-dimensional array; de-noising the second multi-dimensional array, providing a third multi-dimensional array; applying the inverse of the orthogonal transform to the third multi-dimensional array, providing channel estimates for all branches of the receiver.

The method enables the providing of improved channel estimates, in particular improved uplink channel estimates, which gives an improved link performance. Further, the method is robust. If desired signals impinging on the antenna array are widely spread in space, then the antenna correlations may be low. Since the multi-dimensional transforms are orthogonal, no information is lost. The method performs at least as well as prior art when the antenna correlations are low, while offering improved performance when the antenna correlations are high.

The object is according to a second aspect achieved by a network node for estimating a channel. The network node controls an antenna array comprising a number of antennas in one or more spatial dimensions. The network node comprises a receiver receiving signals from the antenna array, a processor and memory, the memory containing instructions executable by the processor, whereby the network node is operative to: obtain matched filter channel estimates for each sub-carrier and antenna of a signal received by the antennas, the signal comprising a number of frequency sub-carriers; arrange the obtained matched filter channel estimates in a first multi-dimensional array, wherein time or frequency domain samples of the matched filter channel estimates are arranged along a first dimension and wherein a second dimension is a first spatial dimension of the number of antennas, wherein the matched filter channel estimates are ordered in the first multi-dimensional array such as to reflect the physical location in space of the antennas; apply an orthogonal transform to the first multi-dimensional array, providing a second multi-dimensional array; de-noise the second multi-dimensional array, providing a third multi-dimensional array; apply the inverse of the orthogonal transform to the third multi-dimensional array, providing channel estimates for all branches of the receiver.

The object is according to a third aspect achieved by a computer program for a network node for estimating a channel, the network node being configurable to control an antenna array comprising a number of antennas in one or more spatial dimensions, and comprising a receiver receiving signals from the antenna array. The computer program comprises computer program code, which, when run on the network node causes the network node to: obtain matched filter channel estimates for each sub-carrier and antenna of a signal received by the antennas, the signal comprising a number of frequency sub-carriers; arrange the obtained matched filter channel estimates in a first multi-dimensional array, wherein time or frequency domain samples of the matched filter channel estimates are arranged along a first dimension and wherein a second dimension is a first spatial dimension of the number of antennas, wherein the matched filter channel estimates are ordered in the first multi-dimensional array such as to reflect the physical location in space of the antennas; apply an orthogonal transform to the first multi-dimensional array, providing a second multi-dimensional array; de-noise the second multi-dimensional array, providing a third multi-dimensional array; apply the inverse of the orthogonal transform to the third multi-dimensional array, providing channel estimates for all branches of the receiver.

The object is according to a fourth aspect achieved by a computer program product comprising a computer program as above, and a computer readable means on which the computer program is stored.

The object is according to a fifth aspect achieved by a network node for estimating a channel, the network node controlling an antenna array comprising a number of antennas in one or more spatial dimensions and comprising means for receiving signals from the antenna array. The network node comprises means for obtaining matched filter channel estimates for each sub-carrier and antenna of a signal received by the antennas, the signal comprising a number of frequency sub-carriers; means for arranging the obtained matched filter channel estimates in a first multi-dimensional array, wherein time or frequency domain samples of the matched filter channel estimates are arranged along a first dimension and wherein a second dimension is a first spatial dimension of the number of antennas, wherein the matched filter channel estimates are ordered in the first multi-dimensional array such as to reflect the physical location in space of the antennas; means for applying an orthogonal transform to the first multi-dimensional array, providing a second multi-dimensional array; means for de-noising the second multi-dimensional array, providing a third multi-dimensional array; means for applying the inverse of the orthogonal transform to the third multi-dimensional array, providing channel estimates for all branches of the receiver.

Further features and advantages of the present disclosure will become clear upon reading the following description and the accompanying drawings.

DETAILED DESCRIPTION

Figure 1:
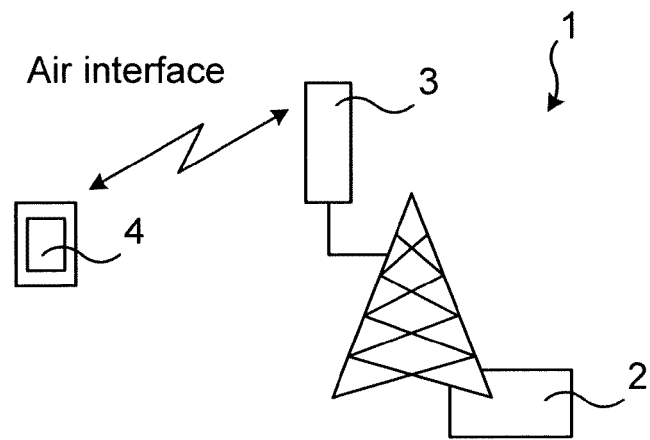
FIG. 1 illustrates schematically an environment in which embodiments of the present disclosure may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, the present disclosure addresses the important issue of channel estimation for antenna arrays with many antenna ports, and in particular but not exclusively uplink (UL) channel estimation for such antenna arrays. In contrast to conventional channel estimation methods, the present disclosure takes into account the geometry of the antenna array or the spatial correlations. The channel estimation method is applicable when OFDM or one of its variants (e.g. SC-FDMA) is used in the air interface. The method disclosed herein is for example applicable to Long Term Evolution (LTE) base station receivers.

FIG. 1 illustrates schematically an environment in which embodiments of the present disclosure may be implemented. FIG. 1 thus illustrates a communication system 1, which may be an LTE network. The communication system 1 provides wireless communication for a number of communication devices 4, and comprises for this end a number of radio access nodes 2 and other network entities. The communication system 1 may typically comprise a radio access network and a core network (not illustrated, and in the case of LTE network, such core network is denoted evolved packet core, EPC). The communication devices 4 may comprise any type of stationary or mobile device and may be referred to in various ways, for example as user equipment (UE), terminal, mobile station, subscriber unit etc. The communication device 4 may be a smart phone, cellular phone, a personal digital assistant, a laptop computer etc. The communication device 4 communicates over an air interface with a radio access node 2, which may be denoted base stations, e.g. evolved Node Bs (eNBs). The radio access node 2 thus comprises or controls means for receiving signals from the communication device 4 (which direction of signaling is denoted uplink), and also for transmitting to the communication device 4 (which signaling direction is denoted downlink). Such means may for example comprise an antenna system comprising e.g. an antenna array 3. It is noted that the radio access node 2 may comprise, or rather control, an antenna system comprising several such antenna arrays 3, which may be placed at different locations within the communication system 1. The antenna array 3 may for example comprise a linear or planar antenna array comprising a number of antennas. The antennas in turn may for example comprise co-polarized or cross-polarized antennas. The antenna system may comprise the one or more antenna arrays 3 with their respective antennas. Each antenna may comprise a number of antenna elements, which antenna elements are interconnected through a beamforming network or interconnection network to an antenna port. Further, the antenna arrays may be active antenna arrays, i.e. comprise low noise amplifiers and related circuitry, or the antenna arrays may be passive antenna arrays not comprising power amplifiers.

As mentioned in the background section, a typical linear or planar antenna array consists of many closely spaced antennas. Because of the close spacing, signals received at neighboring antennas are often highly correlated. Likewise, samples of the received signal which are closely spaced in the frequency domain are often highly correlated. In an aspect of the present disclosure, the received signal is re-ordered into a multi-dimensional (mathematical) array that reflects the geometry of the received signal in frequency and space, whereby a multi-dimensional array of highly correlated entries is obtained. It is known that in this case, applying the multi-dimensional Discrete Cosine Transform (DCT), for example 2D-DCT or 3D-DCT, achieves near-optimum energy compaction. This may be interpreted as a form of beamforming in a transformed domain. Moreover, the multi-dimensional DCT is an orthogonal transform, so there is no loss of information or noise enhancement. Typically, the signal energy will be concentrated in only a few of the multi-dimensional DCT coefficients. Thus, it is possible to de-noise the signal in the multi-dimensional DCT domain. Afterwards, the inverse multi-dimensional DCT is applied in order to transform the data back to the original domain.

Figure 2:
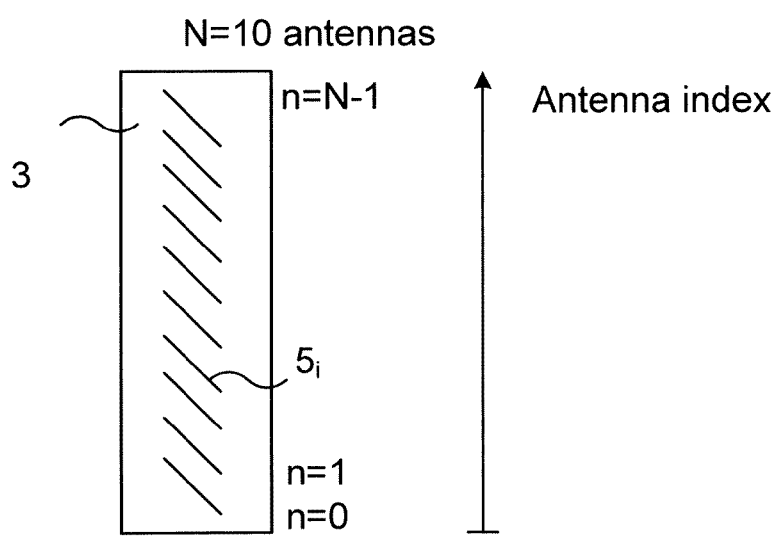
FIG. 2 illustrates a linear antenna array.

Assuming initially that the antenna array 3 comprises a linear antenna array with multiple co-polarized antennas $5_1, \ldots, 5_n, \ldots, 5_{N-1}$ as illustrated in FIG. 2 (N being equal to 10 in the particular illustrated case). First, a digital signal received in each antenna $5_n$ may be converted to the frequency domain by means of a Fast Fourier Transform (FFT). Then a matched channel estimate is performed separately for each antenna $5_n$. That is, the frequency domain signal, received in each antenna $5_n$, is matched to a known reference signal. This results in matched filter channel estimates. These matched filter channel estimates are arranged into a two-dimensional array, as provided below. The first dimension of the array indicates the sub-carrier number k, and the second dimension indicates the antenna index n, according to:

$$\begin{array}{cccc} h_{N-1}(K-1) & \cdots & h_{N-1}(0) & h_{N-1}(0) \\ h_{N-2}(K-1) & \cdots & h_{N-2}(1) & h_{N-2}(1) \\ \vdots & \vdots & \vdots & \vdots \\ h_1(K-1) & \cdots & h_1(1) & h_1(0) \\ h_0(K-1) & \cdots & h_0(1) & h_0(0) \end{array} \quad \begin{array}{c} \uparrow \\ \text{Antenna index} \\ n = 0, \ldots, N-1 \end{array}$$

$$\longleftarrow \text{Sub-carrier index } k = 0, \ldots, K-1 \longrightarrow$$

$h_n(k)$: matched filter channel estimate
n: antenna index k: subcarrier index

The above array is in the following denoted Array 1; also compare reference numeral 13 of FIG. 4, for an illustration of the power of each coefficient.

Next, a 2-dimensional discrete cosine transform (2-D DCT) is applied to this (above) 2-dimensional array of channel estimates. This operation concentrates the signal energy in a few 2D-DCT coefficients in the plane (compare reference numeral 15 of FIG. 4). On the other hand, the noise power is evenly spread over all the DCT coefficients. The coefficients with large amplitudes contain most of the desired signal energy. In an embodiment, the two-dimensional DCT is de-noised by identifying which coefficients contain a significant amount of desired signal energy, and setting all other coefficients to zero (compare reference numeral 17 of FIG. 4). After de-noising, the two-dimensional inverse DCT (IDCT) is applied. The result is a de-noised matched filter channel estimate in the frequency domain (compare reference numeral 19 of FIG. 4).

Figure 3:
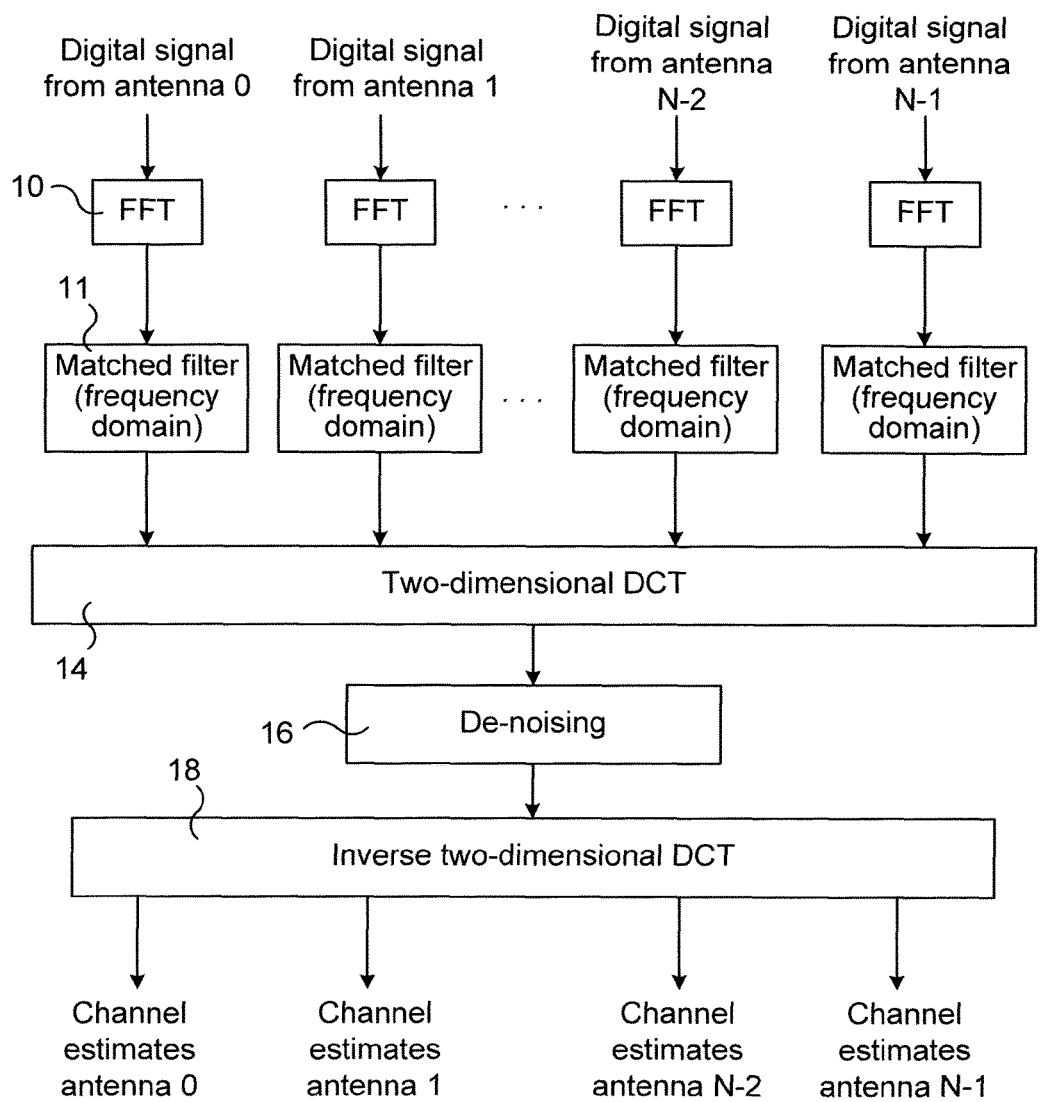
FIG. 3 illustrates an aspect of the present disclosure, in particular a flow chart of a channel estimation method for linear antenna arrays.

The above is described more in detail in the following. FIG. 3 thus illustrates an aspect of the present disclosure, in particular a flow chart of a channel estimation method for linear antenna arrays. In the following example, it is assumed that the antenna system comprises a linear antenna array 3 of co-polarized antennas, but it is noted that the antenna array may e.g. be a planar antenna array. It is further assumed that the linear antenna array 3 comprises N antennas and that the desired signal comprises K sub-carriers in the frequency domain.

In a first step, indicated at box 10, a respective digital signal coming from each antenna is converted to the frequency domain by applying FFT. The digital signals from each antenna are processed separately. This step may be implemented as is conventionally done in OFDM and OFDM-like systems such as e.g. LTE uplink (UL). Such conventional processing may for example comprise, for the case of LTE, cyclic prefix removal followed by serial to parallel conversion and application of FFT etc.

In a second step, indicated at box 11, the frequency domain data from step 1 (box 10) is matched to a known reference signal. For example, pilot symbols known at a receiver may be used such as to derive the amplitude and phase reference of the received signal at the known pilot symbols. The result is a so-called matched filter estimate for each sub-carrier and each antenna. This step may also be implemented as is conventionally done in OFDM and OFDM-like systems such as LTE UL.

In a third step, not explicitly illustrated, the matched filter channel estimates from the second step (box 11) are arranged in a rectangular array. One dimension of the array is indexed the sub-carrier number, and the other dimension is indexed the antenna number. The antennas of the antenna array 3 are numbered according to their physical location in space. In other words, if the physical antennas are labeled n=0, . . . , N−1 as shown in FIG. 2 then the same labeling n=0, . . . , N−1 is used in the earlier given Array 1. Two neighboring rows in the Array 1 correspond to two neighboring antennas in FIG. 2. This is, in an aspect of the present disclosure, important because it is desired to capture the correlation structure present in the physical antenna array 3 in the mathematical Array 1 given earlier.

In a fourth step, indicated at box 14, a two-dimensional DCT is applied to the two-dimensional array of matched filter channel estimates resulting from the third step, i.e. the result obtained after the arrangement of the matched filter channel estimates into an array in correspondence with the Array 1.

In a fifth step, indicated at reference numeral 16, the 2D-DCT coefficients obtained in the fourth step are de-noised. De-noising is the process of identifying and setting e.g. to zero the 2D-DCT coefficients that do not contain significant amounts of desired signal energy. In an aspect of the present disclosure, de-noising is most effective whenever a priori knowledge of the antenna array properties and/or the geometry of the antenna array 3 are included. A simple de-noising algorithm, denoted de-noising Algorithm 1, is based on an energy detector and is given in the following. Inputs to the de-noising Algorithm 1 may comprise:

1) The multidimensional DCT coefficients of the matched filter channel estimates: {ℵ(u, v): 0 ≤ u ≤ K − 1, 0 ≤ v ≤ N − 1}
2) Noise power $\sigma^2$
3) Pre-defined and calibrated threshold $\gamma$ For each coefficient ℵ(u, v) do If $\frac{|ℵ(u, v)|^2}{\sigma^2} \leq \gamma$ then $ℵ_{denoised}$ (u, v) = 0 else $ℵ_{denoised}$ (u, v) = ℵ(u, v)

end

The output then comprise de-noised multi-dimensional DCT coefficients {$ℵ_{denoised}$ (u, v): 0 ≤ u ≤ K − 1, 0 ≤ v ≤ N − 1}

It is noted that the above algorithm is just an example on how to perform the de-noising, and additional example will be provided later.

In a sixth step, indicated at box 18, the two-dimensional inverse DCT (2D-IDCT) is applied to the rectangular array of de-noised 2D-DCT coefficients obtained in the fifth step (box 16).

The output of the sixth step (box 18) is an array containing a de-noised version of the matched filter channel estimate for each antenna and each sub-carrier.

The above described method can be described mathematically as follows. The first and second steps may be implemented according to FFT and matched filtering known in the art, as indicated earlier. In the third step (not illustrated), the matched filter channel estimates are arranged in a rectangular array:

{$h_n(k)$:0≤k≤K−1,0≤n≤N−1}

Here k indicates the sub-carrier number (frequency) and n indicates the antenna number (space). As described above, the order of the antennas in the rectangular (mathematical) array is not arbitrary. On the contrary, the order reflects the actual spatial location of the antennas in (physical) space, in the sense that the channel coefficients for any pair of adjacent antennas are labeled by indices n which differ exactly by one.

In the fourth step (box 14 of FIG. 3) the 2D-DCT is applied to the matched filter channel estimates. This results in another rectangular array {$ℵ_{denoised}(u,v)$:0≤u≤K−1, 0≤v≤N−1} of 2D-DCT coefficients defined by:

$$ℵ(u, v) = \sum_{k=0}^{K-1}\sum_{n=0}^{N-1} \alpha_k \beta_n h_n(k) \cos\left(\frac{\pi}{K}\left(k + \frac{1}{2}\right)u\right)\cos\left(\frac{\pi}{N}\left(n + \frac{1}{2}\right)v\right),$$

$$\alpha_k = \begin{cases} \frac{1}{\sqrt{K}} & \text{if } k = 0 \\ \sqrt{\frac{2}{K}} & \text{if } k > 0 \end{cases},$$

$$\beta_k = \begin{cases} \frac{1}{\sqrt{N}} & \text{if } n = 0 \\ \sqrt{\frac{2}{N}} & \text{if } n > 0 \end{cases}.$$

A shorthand notation for this equation is ℵ(u,v)=2D-DCT{$h_n(k)$}.

In the fifth step (box 16 of FIG. 3), the 2D-DCT coefficients are de-noised, for example according to the algorithm given earlier. De-noising may be defined as the process of setting to zero the 2D-DCT coefficients that contain mostly noise energy and do not contain significant amounts of desired signal energy. The output of this step is a rectangular array of de-noised 2D-DCT coefficients {$ℵ_{denoised}(u,v)$:0≤u≤K−1,0≤v≤N−1}

The noise power $\sigma^2$ at the receiver can be determined with high accuracy, based on measurements (e.g. temperature), radio calibration, and a priori knowledge (e.g. a noise figure of the receiver chain, calculated during production/calibration of the radio and stored in a look-up table). Therefore, it is advantageous, but not necessary, to include a priori knowledge of the noise power in the de-noising process. Other a priori knowledge may also or alternatively be incorporated into the de-noising process.

Figure 5:
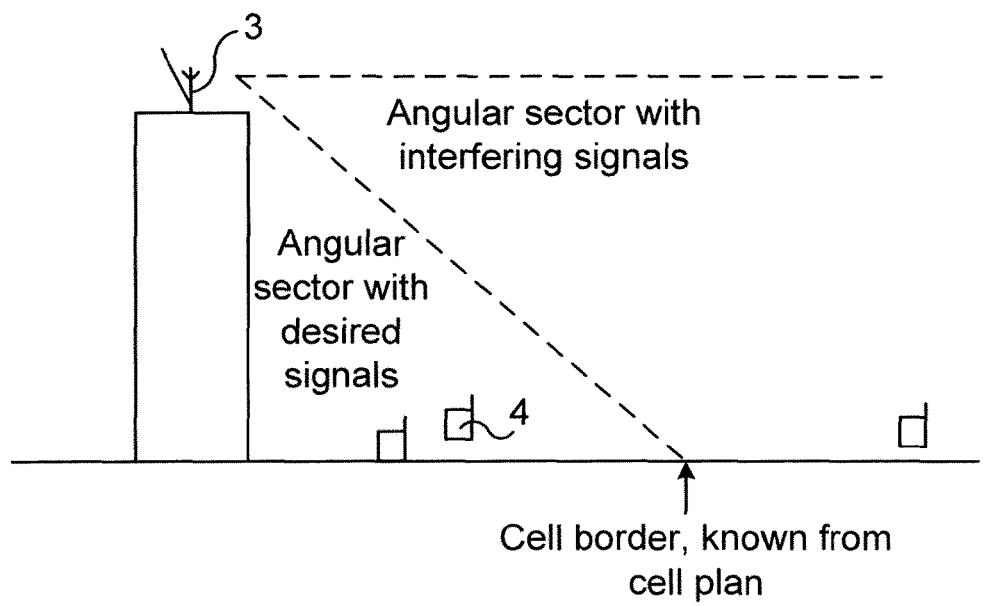
FIG. 5 illustrates an example of use of a priori knowledge.

In some circumstances it is known a priori that the desired signals arrive from a known angular sector in either the elevation domain or the azimuth domain, or both. This is shown in FIG. 5 (thus illustrating an example of using a priori knowledge). That is, a radio access node comprising or controlling the antenna array 3 arranged so as to provide coverage to a certain area, e.g. be tilted so as to provide signaling coverage within a cell or sector. Communication devices 4 located within this sector are most probably communicating with this particular radio access node 2 and the signaling coming from within this angular sector therefore most probably comprise desired signals. It can also be known that interfering signals arrive from within a known angular sector (in azimuth, elevation or both). Such interfering signals may thus come from communication devices communicating with another radio access node, but located close to the cell border between the respective coverage areas from the two radio access nodes and such angular sector with interfering signals may thus also be known a priori.

Figure 6:
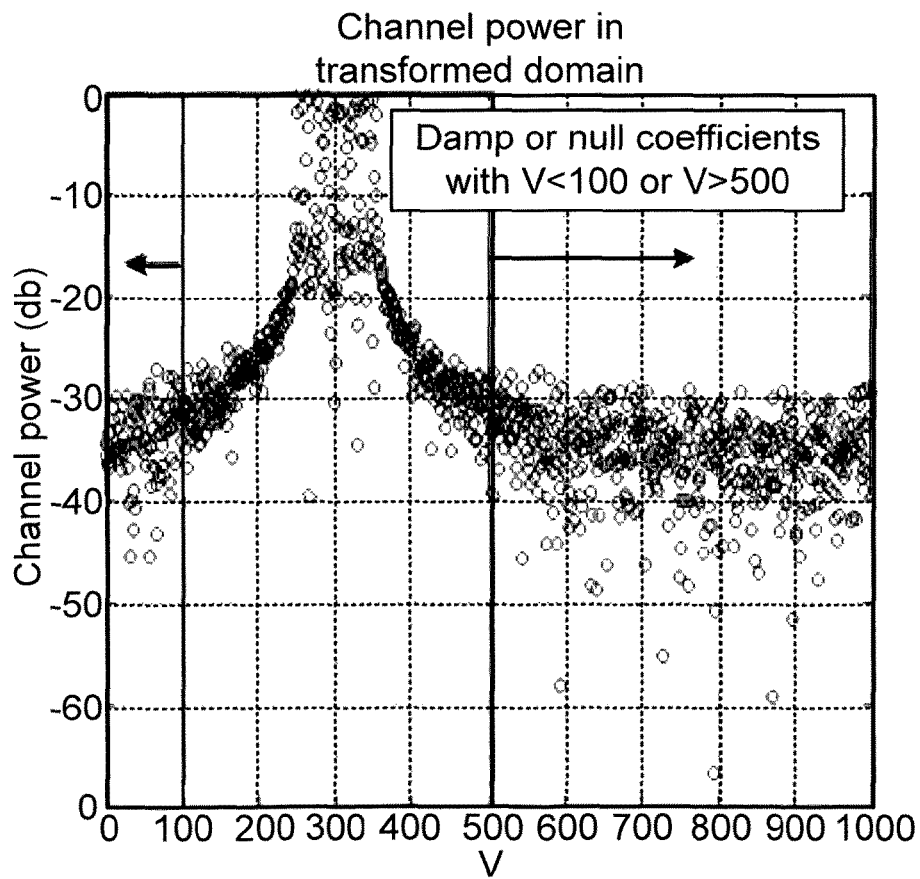
FIG. 6 illustrates an example of distribution of channel power in transformed domain for a desired signal confined to a known angular sector.

For example, for a vertical linear array on a macro site, located over roof top, network planning may determine the angular sector (in elevation) defining the serving and interfering cells. When the angular spread is restricted to an angular sector, the DCT and DFT (in the spatial) domain, concentrate the energy in a few spatial coefficients, which depend on the angle of arrival (in fact, due to this, the DFT or DCT can be used to compute the angle of arrival). FIG. 6 illustrates an example of how the channel power is concentrated in a subset of the coefficients whenever the signal is concentrated in the angular sector shown in FIG. 5. In FIG. 6, the y-axis indicates channel power (in dB) and the x-axis indicates antenna index (v). The indexes of those coefficients are known also a priori, since they depend only on the direction of arrival. In the example of FIG. 6, the signal coefficients in the transformed domain ℵ (u,v) with v<100 or v>500 are known a priori to contribute little energy to the desired signal. Hence, based on this a priori knowledge, it is possible to null or dampen some of the DCT or DFT coefficients where it is known a priori that there is only noise or interference.

Coupling among antennas correlates the received signals. The coupling matrix can also be known a priori, for example from calibration measurements. This known matrix can be incorporated into the calculation of the coefficients to be nulled or damped. The choice of the DCT or DFT coefficients to be nulled or damped may be done according to:

A de-noising algorithm, denoted de-noising Algorithm 2, based on an energy detector (compare FIG. 6), and utilizing the a priori knowledge of the noise power, directions of arrival of signals and interference, and coupling matrix, is given next. Inputs to the de-noising Algorithm 2 may comprise:

---

1) The multidimensional DCT coefficients of the matched filter channel estimates: $\{\aleph(u, v): 0 \le u \le K - 1, 0 \le v \le N - 1\}$
2) Noise power $\sigma^2$ (known a priori, i.e. in advance)
3) Pre-defined and calibrated threshold $\gamma$
4) Index set of coefficients to be damped $\{v: 0 \le j \le P\}$
5) Damping coefficient (pre-computed) $\{\rho: 0 \le \rho \le 1\}$ For each coefficient $\aleph(u, v)$ do
  $\aleph_{damped}(u, v) = \aleph(u, v)$
  if $v == v_j$ for some $0 \le j \le P$ then
  $\aleph_{damped}(u, v) = \rho \cdot \aleph(u, v)$
  end If $\dfrac{|\aleph_{damped}(u, v)|^2}{\sigma^2} \le \gamma$ then $\aleph_{denoised}(u, v) = 0$    else
  $\aleph_{denoised}(u, v) = \aleph_{damped}(u, v)$
  end
end

---

The output then comprise de-noised multi-dimensional DCT coefficients $$\{\aleph_{denoised}(u,v): 0 \le u \le K-1, 0 \le v \le N-1\}$$

The damping coefficient $0 \le \rho \le 1$ weights down the coefficients which are known a priori to contribute mostly noise or interference, and is thus set accordingly. If the amount of desired energy in those coefficients is known a priori to be negligible, then a good choice is $\rho=0$.

Another de-noising algorithm, denoted de-noising Algorithm 3, that can be very useful in practice due to its simplicity consists in nulling all but the M strongest branches in the transformed domain, where M is a pre-determined integer, i.e. according to:

Inputs to the de-noising Algorithm 3 may comprise:

---

1) The multidimensional DCT coefficients of the matched filter channel estimates
2) Number of branches to keep M (pre-determined)

// Compute the total power for each v $$\text{Power}(v) = \sum_{u=0}^{K-1} |\aleph(u, v)|^2$$

// Sort the total power in falling order, the highest power first
$\text{Power}(v_0) \ge \text{Power}(v_1) \ge \ldots \ge \text{Power}(v_{M-1}) \ge \text{Power}(v_M) \ge \ldots \ge \text{Power}(v_{N-1})$
// Select the M strongest branches in the transformed domain
$v_0, \ldots, v_{M-1}$
// Keep the M strongest branches in the transformed domain, null the rest
  If v is equal to one of $v_0, \ldots, v_{M-1}$ then
    for all u set $\aleph_{denoised}(u, v) = \aleph(u, v)$
  else
    for all u set $\aleph_{denoised}(u, v) = 0$
  end

---

It is also noted that the input parameters to the described algorithms Algorithm 1, Algorithm 2 and Algorithm 3 may be controlled by the network, and changed dynamically, on a time slot, sub-frame, frame level, or at some other times determined by the network. Moreover, further de-noising methods can be obtained by combining the methods described above. For example, one may first apply the de-noising Algorithm 3 and then feed the de-noised output as input to the de-noising Algorithm 1.

Finally, in step 6 (box 18), the 2D-IDCT is applied to the de-noised 2D-DCT coefficients:

$$h_{denoised,n}(k) = 2D\text{-}IDCT\{\aleph_{denoised}(u,v)\}$$

The output from step 6 is an improved, de-noised channel estimate:

$$\{h_{denoised,n}(k): 0 \le k \le K-1, 0 \le n \le N-1\}$$

Figure 4:
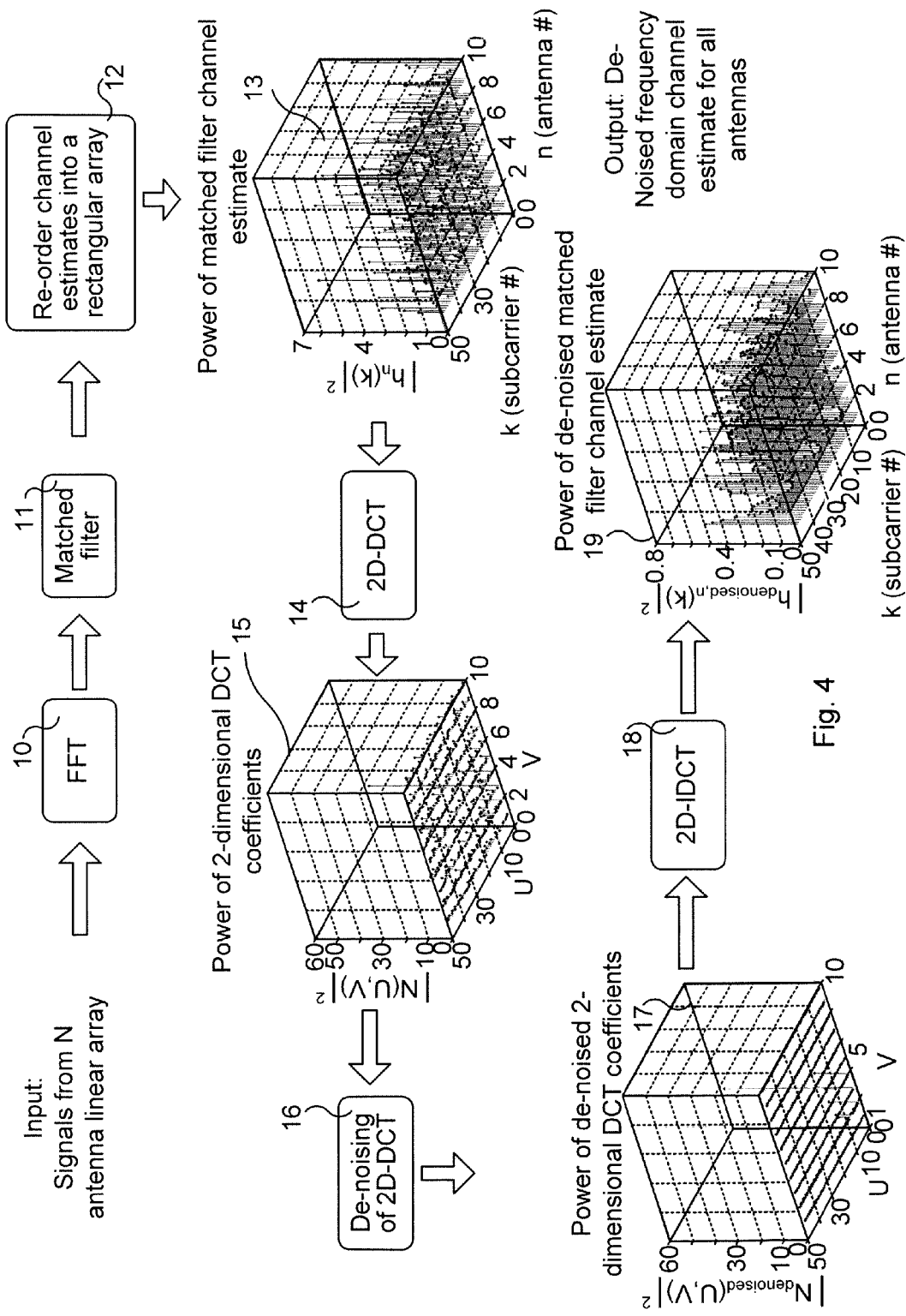
FIG. 4 is another illustration of the channel estimation method of FIG. 3, including illustrations of intermediate results.

FIG. 4 is another illustration of the channel estimation method of FIG. 3, including schematic illustrations of intermediate results. The channel estimation method is thus summarized in FIG. 4. Again, signals from the N antennas of the linear antenna array, are input to the FFT (box 10), wherein the FFT processing is performed separately for each antenna. Next, the frequency domain data output from the FFT are matched to a known reference signal, providing matched filter estimates (box 11). Again, the FFT is applied to the signals from each antenna separately. Next, at box 12, the re-ordering of the matched filter channel estimates into the rectangular (mathematical) array is performed. The matched filter channel estimates are illustrated schematically at reference numeral 13. On the vertical axis power of each coefficient is indicated, on one of the horizontal axes the antenna element index is indicated and on the other horizontal axis the sub-carrier is indicated. In the particular example, there are N=10 antennas and K=48 sub-carriers, and the power of each coefficient is thus shown. Next, at box 14, the 2D-DCT is applied to the two-dimensional array of matched filter channel estimates output from box 12. At reference numeral 15, the 2D-DCT of matched filter channel estimates are shown. On the vertical axis power of each coefficient is indicated, on one of the horizontal axis's the antenna index is indicated and on the other horizontal axis the sub-carrier is indicated (in frequency domain). As illustrated, this operation concentrates the signal energy in a few 2D-DCT coefficients in the plane. On the other hand, the noise power is evenly spread over all the DCT coefficients. Next, at box 16, the 2D-DCT coefficients are de-noised, identifying which coefficients contain a significant amount of desired signal energy, and setting all other coefficients to zero or close to zero. An exemplary result of this is illustrated at reference numeral 17. At reference numeral 17 thus, de-noised two-dimensional DCT of matched filter channel estimates are shown. Next, at box 18, the 2D-IDCT is performed, an exemplary result of which is illustrated at reference numeral 19. Reference numeral 19 thus illustrates de-noised matched filter channel estimate. The output is thus de-noised frequency domain channel estimates for all antennas. The channel estimates shown at reference numeral 19 are de-noised versions of the channel estimates shown at reference numeral 13.

In an aspect of the present disclosure thus, the geometry of the antenna system is included into the channel estimate, or rather the calculations of the channel estimate. Arranging the matched filter estimates into a rectangular array and applying the two-dimensional DCT are efficient means of exploiting the correlations present jointly among different sub-carriers and antennas, as shown. The result is a high degree of energy compaction in the transformed 2D-DCT domain, as seen at reference numeral 15. Moreover, there are very efficient algorithms to compute the multi-dimensional DCT.

Figure 7:
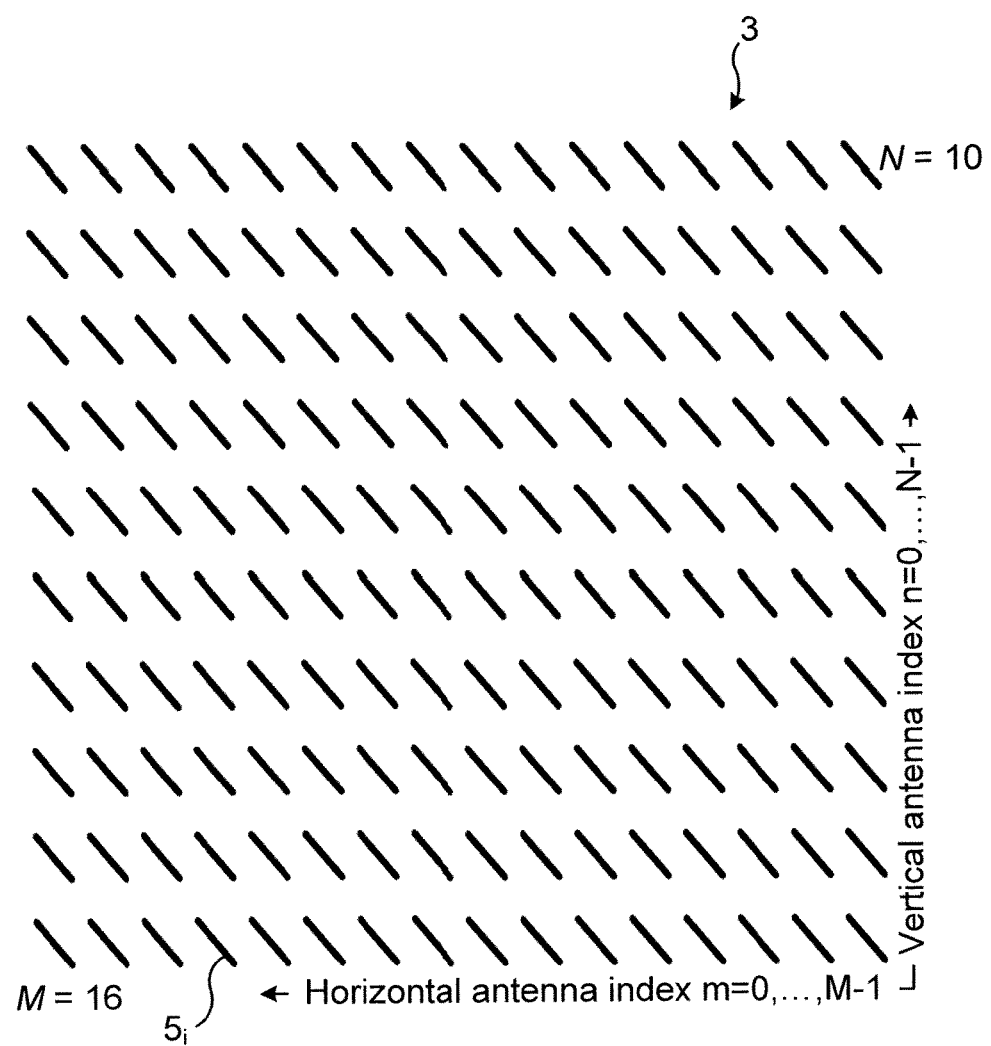
FIG. 7 illustrates a planar co-polarized antenna array.
Figure 8:
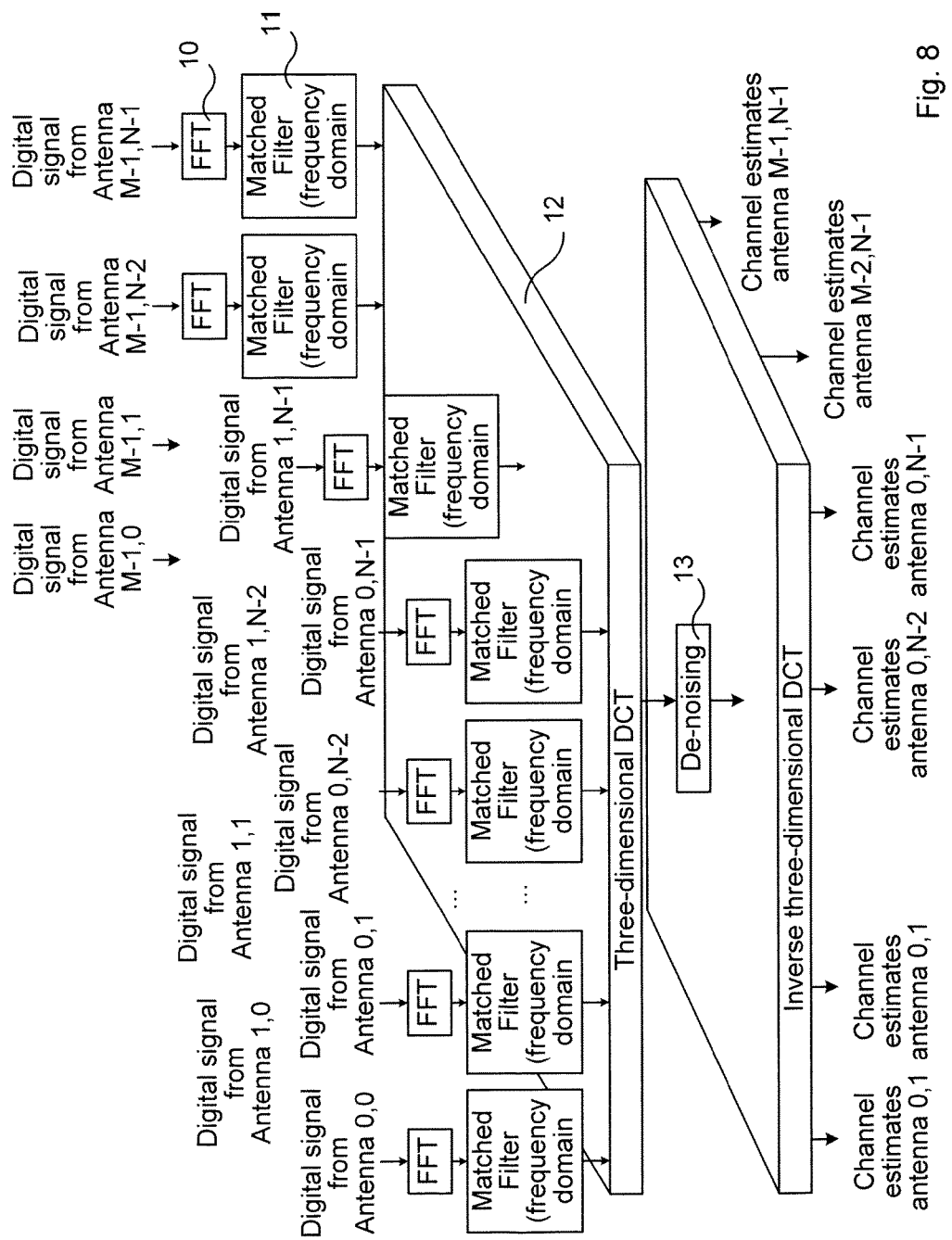
FIG. 8 illustrates an aspect of the present disclosure, in particular a flow chart of a channel estimation method for planar antenna arrays.

The method may be generalized to planar antenna arrays, in which case the matched filter channel estimates are arranged into a three-dimensional (mathematical) array and the 3D-DCT is applied. FIG. 7 illustrates a rectangular antenna array 3 comprising co-polarized antennas $5_i$ with M columns and N rows (M=16 and N 10 in the particular illustrated case). On the one spatial dimension axis (vertical) vertical antenna element indexes are shown, n=0, . . . , N−1, and on the other spatial dimension axis (horizontal) horizontal antenna indexes are shown, M=0, . . . , M−1. The channel estimation method given next is a modification of the method as has been described for the linear antenna array. FIG. 8 illustrates an aspect of the present disclosure, in particular a flow chart of a channel estimation method for planar antenna arrays, and the same reference numerals are used for this planar antenna array as was used for the linear antenna array.

In a first step, box 10, the digital signal coming from each respective antenna is converted to the frequency domain by applying the FFT. The digital signal from each respective antenna is processed separately. This may be done according to conventional processing in OFDM and OFDM-like systems such as LTE UL (as for the case of linear antenna array).

In a second step, box 11, the frequency domain data from step 1 is matched to a known reference signal. The result is a so-called matched filter estimate for each sub-carrier and each antenna. This may also be done according to conventional processing in OFDM and OFDM-like systems such as LTE UL (as for the case of linear antenna array).

Figure 9:
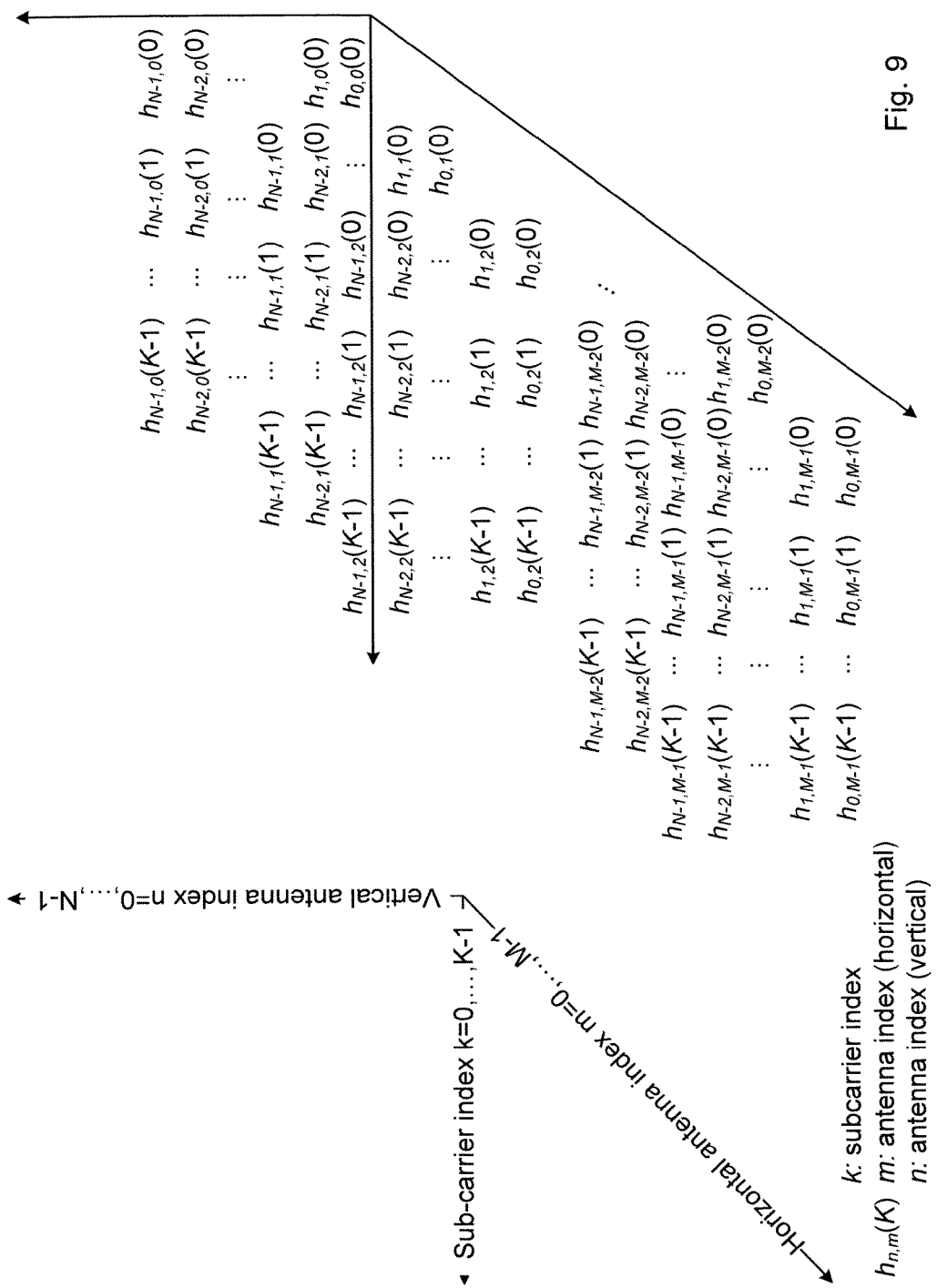
FIG. 9 illustrates a matched filter channel estimate arranged in a three-dimensional array.

In a third step, not illustrated, the data from the second step (box 11) is arranged in a three-dimensional array $\{h_{n,m}(k): 0 \leq k \leq K-1, 0 \leq n \leq N-1, 0 \leq m \leq M-1\}$, as illustrated in FIG. 9. One dimension of the mathematical array of FIG. 9 is the sub-carrier number; the other two dimensions correspond to the vertical and horizontal spatial dimensions of the antennas $5_i$ of the antenna array 3. The antennas are numbered according to their physical location in space, so that channel estimates corresponding to physically adjacent antennas are also adjacent in the three dimensional (mathematical) array. Again, this is important because it is desired to capture, in the mathematical array of FIG. 9, faithfully the correlation structure present in the physical planar antenna array (shown in FIG. 7).

In a fourth step, box 12, the three-dimensional DCT is applied to the two-dimensional array of matched filter channel estimates from the third step. In mathematical terms, the three dimensional array of 3D-DCT coefficients $\{\aleph(u,v,w): 0 \leq u \leq K-1, 0 \leq v \leq N-1, 0 \leq w \leq M-1\}$ is computed according to the expression $$\aleph(u, v, w) = \sum_{k=0}^{K-1} \sum_{n=0}^{N-1} \sum_{m=0}^{M-1} \alpha_k \beta_n \gamma_m h_{n,m}(k) \cos\left(\frac{\pi}{K}\left(k+\frac{1}{2}\right)u\right) \cos\left(\frac{\pi}{N}\left(n+\frac{1}{2}\right)v\right)$$

$$\cos\left(\frac{\pi}{M}\left(m+\frac{1}{2}\right)w\right)$$

$$\alpha_k = \begin{cases} \frac{1}{\sqrt{K}} & \text{if } k = 0 \\ \sqrt{\frac{2}{K}} & \text{if } k > 0 \end{cases}$$

$$\beta_k = \begin{cases} \frac{1}{\sqrt{N}} & \text{if } n = 0 \\ \sqrt{\frac{2}{N}} & \text{if } n > 0 \end{cases}$$

-continued $$\gamma_k = \begin{cases} \frac{1}{\sqrt{M}} & \text{if } m = 0 \\ \sqrt{\frac{2}{M}} & \text{if } m > 0 \end{cases}$$

In a fifth step, box 13, the 3D-DCT coefficients obtained in the fourth step are de-noised. De-noising is, as mentioned earlier, the process of setting to zero the 3D-DCT coefficients that do not contain significant amounts of desired signal energy. The output from this step is the three dimensional array of de-noised coefficients $$\{\aleph_{denoised}(u,v,w): 0 \leq u \leq K-, 0 \leq v \leq N-1, 0 \leq w \leq M-1\}$$

In a sixth step, box 14, the three-dimensional inverse DCT (3D-IDCT) is applied to the rectangular array of de-noised 3D-DCT coefficients obtained in the fifth step. The output of this step is the de-noised matched filter channel estimates $\{h_{denoised,n,m}(k): 0 \leq k \leq K-1, 0 \leq n \leq N-1, 0 \leq m \leq M-1\}$ corresponding to all antennas and all sub-carriers.

Figure 10:
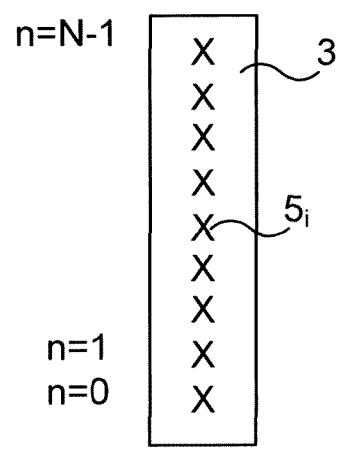
FIG. 10 illustrates a linear antenna array with cross-polarized antennas.
Figure 11:
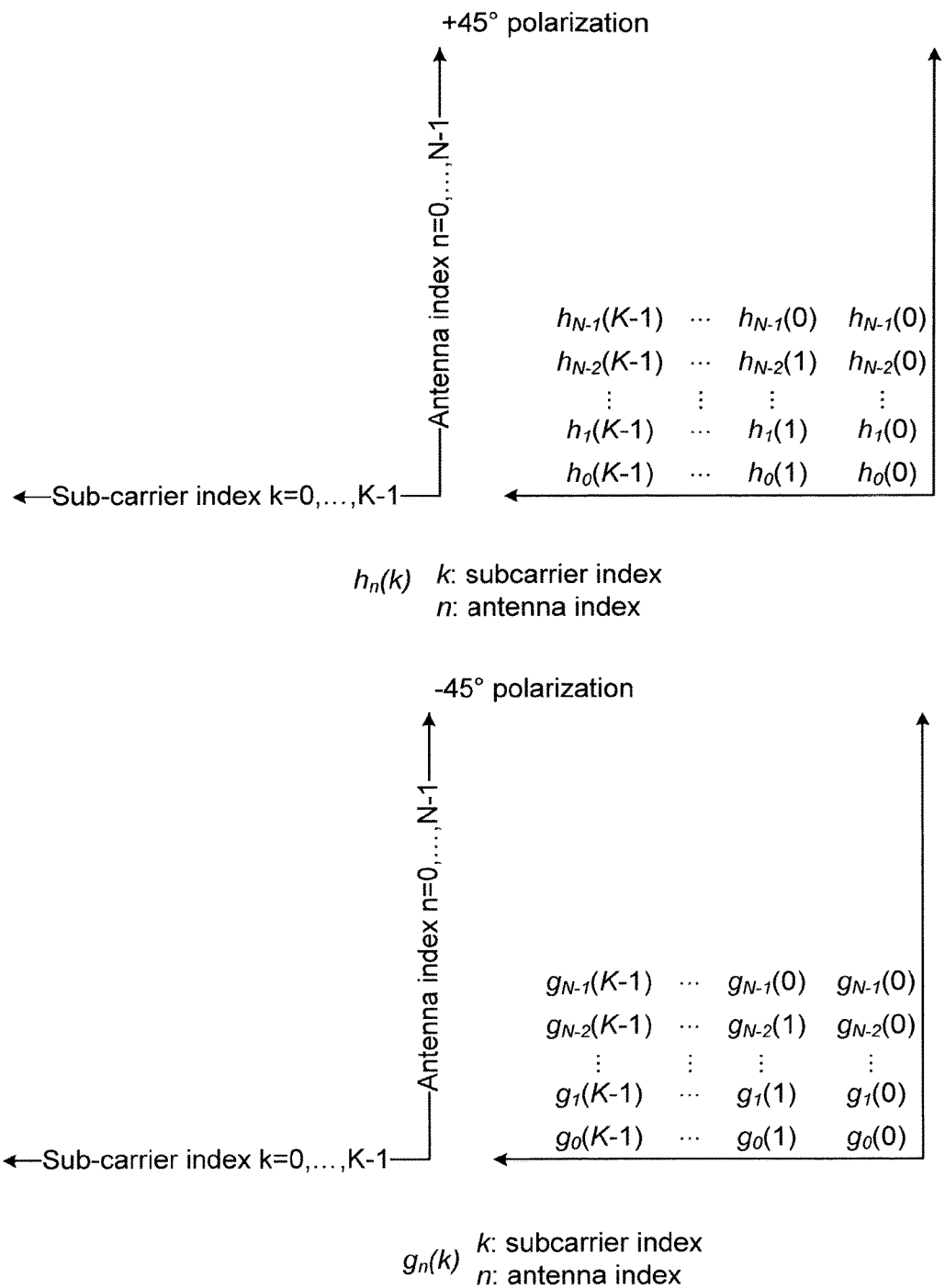
FIG. 11 illustrates channel estimates corresponding to antennas with different polarizations considered separately.

The method may also be extended to cross-polarized antennas. FIG. 10 illustrates a linear antenna array 3 with cross-polarized antennas $5_i$. Unlike the case of co-polarized antennas, two closely located elements with different polarizations will often exhibit low correlation. Since the method, in an aspect of the present disclosure, exploits spatial antenna correlations, it is convenient to estimate the channels corresponding to different polarizations separately, as illustrated in FIG. 11. In this case, the matched filter channel estimates corresponding to +45 degree polarization are arranged into one rectangular (mathematical) array $\{h_n(k): 0 \leq k \leq K-1, 0 \leq n \leq N-1\}$ (uppermost array), while the matched filter channel estimates corresponding to −45 degree polarization are arranged into a second rectangular (mathematical) array $\{g_n(k): 0 \leq k \leq K-1, 0 \leq n \leq N-1\}$ (lowermost array). The method described for the linear co-polarized antenna array is applied separately to each (mathematical) array. Extensions to planar cross-polarized arrays are now straightforward. Once again each polarization is considered separately, and the matched filter channel estimates are arranged into two three-dimensional arrays. The method described for the planar co-polarized antenna array is then applied separately to each three-dimensional array.

While the description of the present disclosure has emphasized the use of the multi-dimensional DCT, other transforms such as the multi-dimensional DFT may also be used and may work well in practice and produce satisfactory results. It is even possible to apply hybrid transforms. For example, one transform (e.g. DCT) is applied in the sub-carrier domain, while another transform (e.g. Discrete Sine Transform, DST) is applied in the spatial domain. This might be a good option when the antenna correlations are not too high, in which case the DST achieves better energy compaction than the DCT. The ideal transform is the multidimensional Karhunen-Loeve transform, because it achieves complete de-correlation and maximum energy compaction. However, this transform is not best choice in practice because it is data dependent, and it requires rather complex computations, thus requiring high processing capacity. However, when the correlations among neighboring array elements are close to one, the DCT (which is independent of the data and can be computed efficiently) is a good approximation to the Karhunen-Loeve transform. Similarly, when the correlations are close to zero, the DST is a good approximation to the Karhunen-Loeve transform.

The selection of transform will be elaborated on in the following. Thus, in general, the choice of the transforms can made depending upon one or more of the following:
- Array geometry, and in particular the antenna spacing.
- Mutual coupling among array elements. Coupling results in correlations among the antennas.
- Radio propagation environment. The physical location of the array, together with the scattering environment, determine the angular spread of the signals received at the array.

As a first example, consider an antenna array with closely spaced antennas. This antenna array geometry tends to give high correlations, although it is noted that the correlations also depend on the propagation environment; with line of sight and low angular spreads giving also high correlations. As a second example, closely spaced antennas may also give raise to mutual coupling among nearby antennas, although this is not necessarily the case as careful antenna design may reduce dramatically such mutual coupling. The mutual coupling can be found from the antenna design and/or antenna calibration measurements. As a third example, the angular spread (in azimuth or elevation) of the received signal also determines the correlations. Low angular spread tends to result in high correlations, while large angular spreads tend to give low correlations. Thus for a vertical linear antenna array consisting of closely spaced antennas, located over roof top and serving a macro-cell, the angular spread is quite limited, e.g. just a few degrees, resulting in large correlations.

A hybrid transform could be employed as follows, considering a linear array of co-polarized elements with large antenna separation. The antenna separation may for example be a distance of 2 wavelengths between adjacent antennas. Then the following two-dimensional transformation could be applied to the array of matched filter channel estimates $\{h_n(k):0 \leq k \leq K-1, 0 \leq n \leq N-1\}$ (recalling that k is the subcarrier in the frequency domain and n the antenna number in the spatial domain):

$$\aleph(u,v) = \sum_{k=0}^{K-1} \sum_{n=0}^{N-1} \alpha_k \beta_n h_n(k) \cos\left(\frac{\pi}{K}\left(k+\frac{1}{2}\right)u\right) \sin\left(\frac{\pi}{N}\left(n+\frac{1}{2}\right)(v+1)\right)$$

$$\alpha_k = \begin{cases} \frac{1}{\sqrt{K}} & \text{if } k=0 \\ \sqrt{\frac{2}{K}} & \text{if } k>0 \end{cases}$$

$$\beta_k = \begin{cases} \frac{1}{\sqrt{N}} & \text{if } n=N-1 \\ \sqrt{\frac{2}{N}} & \text{if } n<N-1 \end{cases}$$

In other words, $\aleph(u,v) = DCT\{DST\{h_n(k)\}\}$. De-noising of the coefficients $\aleph(u,v)$ can be performed as described earlier. The de-noised matched the filter channel estimate is $h_{denoised,n}(k) = IDST\{IDCT\{\aleph_{denoised}(u,v)\}\}$.

Figure 12:
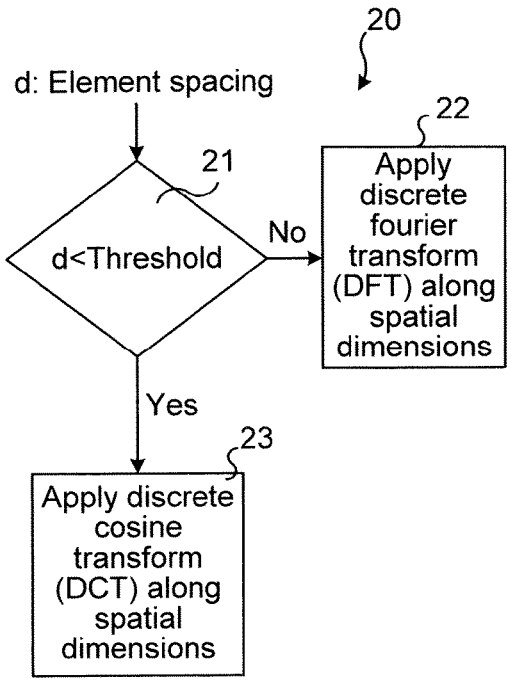
FIGS. 12 and 13 illustrate flow chart for choice of transform based on a geometrical property of the antenna array.
Figure 13:
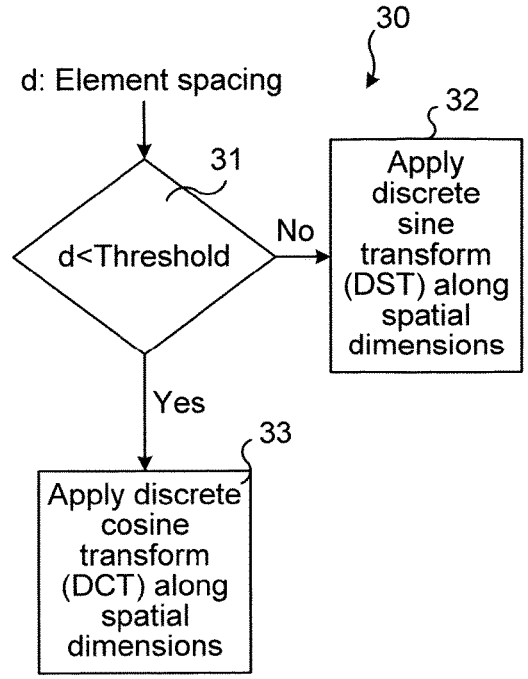

FIGS. 12 and 13 illustrate flow charts for choice of transform based on a geometrical property of the antenna array. FIGS. 12 and 13 thus illustrate possible choices of the transform for the spatial domain, based on the antenna separation. The selection process 20 illustrated in FIG. 12 starts with inputting, to box 21, an antenna spacing d. In box 21, it is determined whether this input antenna spacing d is smaller than a threshold value. The threshold value may for example be set to 1 wavelength. If the antenna spacing d is smaller than the threshold value flow continues to box 23, and a DCT is selected and applied along the spatial dimensions. If the antenna spacing d is larger than a threshold value, flow instead continues to box 22, and DFT is selected and applied along the spatial dimensions.

The selection process 30 of FIG. 13 starts with inputting, to box 31, an antenna spacing d. In box 31, it is determined whether this input antenna spacing d is smaller than a threshold value. The threshold value may, as for the previous case, for example be set to 1 wavelength. If the antenna spacing d is smaller than the threshold value flow continues to box 33, and a DCT is selected and applied along the spatial dimensions. If the antenna spacing d is larger than a threshold value, flow instead continues to box 32, and DST is selected and applied along the spatial dimensions.

Figure 14:
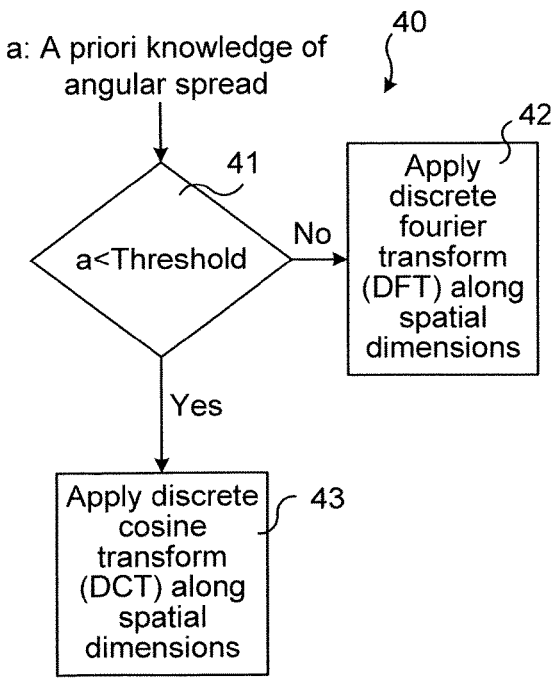
FIG. 14 illustrates a flow chart for choice of transform based on a priori knowledge of angular spread.

FIG. 14 illustrates how a-priori knowledge of the angular spread can be used to choose the transform in the spatial domain. FIG. 14 thus illustrates a flow chart for choice of transform based on a priori knowledge of angular spread. The selection process 40 of FIG. 14 starts with inputting, to box 41, a priori knowledge about angular spread of signals incoming to the antenna array 3. Such angular spread of signals incoming to the antenna array 3 is often known in advance, e.g. as a result of knowing how the antenna array 3 is tilted (refer also to FIG. 5 and related description). In box 41, it is determined whether this input a priori knowledge about the angular spread is smaller (e.g. measured in degrees) than a threshold value. For this case, the threshold value may be set based e.g. on the particular environment of the antenna array, e.g. set to 5 degrees for environments having low elevation spread. If the a priori knowledge about the angular spread is smaller than the threshold value, the flow continues to box 43, and DCT is selected and applied along the spatial dimensions. If, the a priori knowledge about the angular spread is larger than the set threshold, then the flow instead continues to box 42, and DFT is selected and applied along the spatial dimensions.

Figure 15:
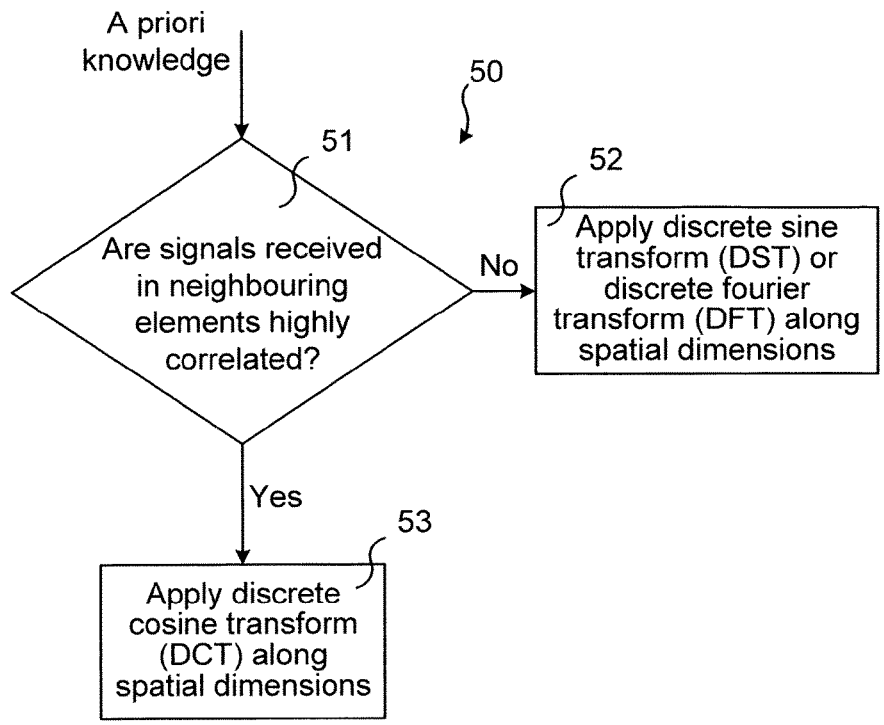
FIG. 15 illustrates a flow chart for choice of transform based on a priori knowledge of antenna array characteristics and propagation environment.

FIG. 15 illustrates a flow chart for choice of transform based on a priori knowledge of antenna array characteristics and propagation environment. FIG. 15 shows how that priori knowledge can be used to determine the expected correlations among antennas, and the transform is chosen based on those correlations. The selection process 50 of FIG. 15 starts with inputting, to box 51, a priori knowledge about characteristics of the antenna array 3 and the propagation environment. Such information is often known in advance, e.g. as a result of knowing antenna array 3 data such as antenna spacing, array coupling. The a priori knowledge about the propagation environment may for example comprise how much signals are (typically) scattered owing to many high buildings or mountains for example, and/or angular spread. In box 51, it is determined, based on this input a priori knowledge, if signals received in neighboring antennas are highly correlated. As a particular example, a correlation value (in magnitude) between adjacent antennas larger than 0.7 can be considered high and otherwise correlation between adjacent antennas is low. If yes, i.e. if signals received in neighboring antennas are determined to be highly correlated, then the flow continues to box 53, and DCT is selected and applied along the spatial dimensions. If, the outcome of box 51 is "no", then the flow instead continues to box 52, and DFT or DST is selected and applied along the spatial dimensions.

From the various exemplary selection processes 20, 30, 40, 50 given in relation to FIGS. 12, 13, 14 and 15, it is clear that the method may be adapted in view of the particular application at hand. In particular, by selecting the transform to be applied e.g. in view of the geometry of the antenna array, a method tailored for the particular antenna array at hand is provided. High accuracy for various environments may thus be obtained by using the method.

Figure 16:
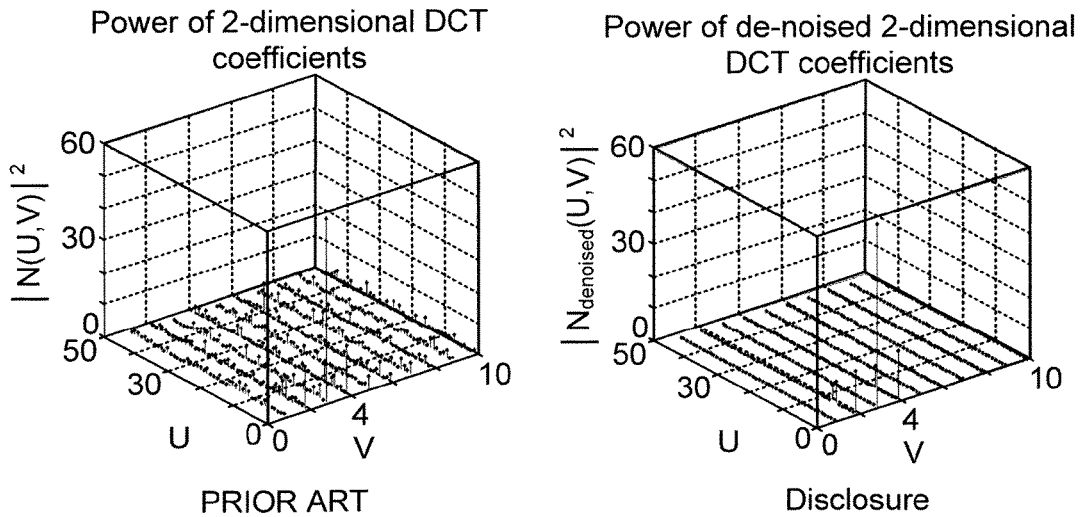
FIG. 16 illustrates a comparison of channel estimate according to prior art and according to the present disclosure, respectively.

FIG. 16 illustrates a comparison of channel estimate according to prior art and according to the present disclosure, respectively. At the left hand side a prior art channel estimate per antenna is illustrated in the DCT domain. In particular, the energy of the DCT of the channel coefficients is shown. On the right hand side, a corresponding figure is shown for embodiments of the present disclosure. Channel estimates in the two-dimensional DCT domain are thus shown, and in particular the energy of the two-dimensional DCT coefficients. As can be seen when comparing the figures, a higher energy compaction is obtained by the present disclosure compared to the prior art, owing to the fact that antenna correlations are exploited. In contrast to the prior art, the present disclosure takes into account spatial correlation of the signals, in particular correlation both in time and space. Physical correlation information is destroyed if antenna numbers are not taken into account. In practice, this may be implemented by allocating a first buffer of the receiver to a first antenna, a second buffer to a second antenna etc., and keeping track of which buffer is allocated to which physical antenna.

Figure 17:
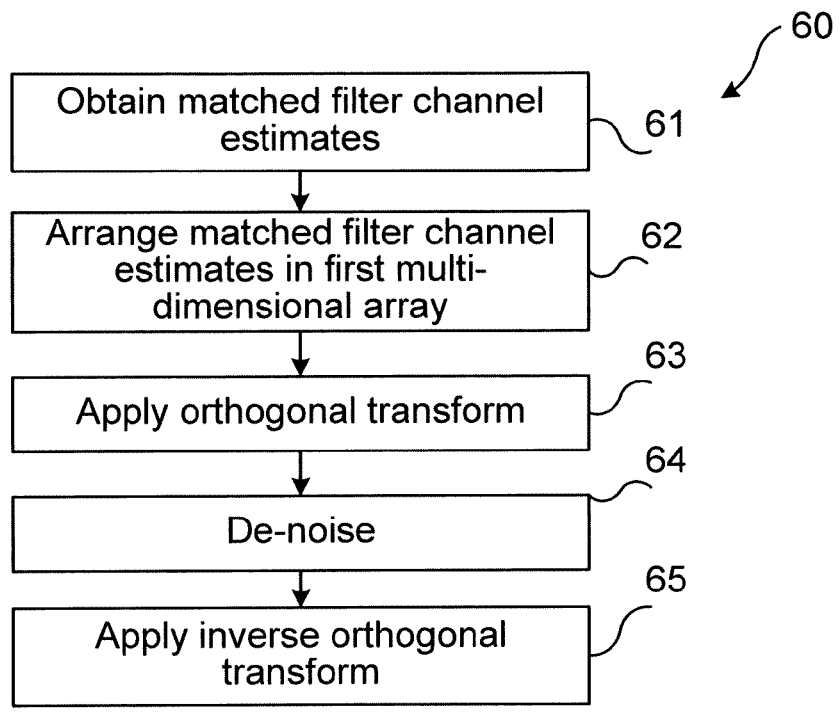
FIG. 17 illustrates a flow chart over steps of a method in a network node in accordance with the present disclosure.

The described features of the various embodiments may be combined in different ways. FIG. 17 illustrates a flow chart over steps of a method in a network node in accordance with the present disclosure. The method 60 may be performed in a network node 2, such as a radio access node (see FIG. 1 and related description) for estimating a channel. The network node 2 controls an antenna array 3 comprising a number N of antennas $5_1, \ldots, 5_N$ in one or more spatial dimensions. The network node 2 further comprises a receiver 72 receiving signals from the antenna array 3.

The method 60 comprises obtaining 61 matched filter channel estimates for each sub-carrier and antenna of a signal received by the antennas $5_1, \ldots, 5_N$, the signal comprising a number K of frequency sub-carriers. The obtaining 61 of the matched filter channel estimates may be performed in conventional manner. For example, the obtaining 61 may comprise converting a digital signal from each antenna $5_1, \ldots, 5_N$ to frequency domain, and matching the frequency domain data for each antenna signal to a known reference signal. Further description on how to obtain the matched filter channel estimates have been given e.g. in relation to FIGS. 3 and 4 (boxes 10 and 11).

The method 60 comprises arranging 62 the obtained matched filter channel estimates in a first multi-dimensional array, wherein time or frequency domain samples of the matched filter channel estimates are arranged along a first dimension and wherein a second dimension is a first spatial dimension of the number N of antennas, wherein the matched filter channel estimates are ordered in the first multi-dimensional array such as to reflect the physical location in space of the antennas $5_1, \ldots, 5_N$. The multidimensional array may e.g. have two dimensions, or three dimensions etc.

The method 60 comprises applying 63 an orthogonal transform to the first multi-dimensional array, providing a second multi-dimensional array. The multi-dimensional transform being orthogonal ensures that no information is lost, irrespective of whether the desired signals are widely spread in space giving low antenna correlations or whether antenna correlations are high.

The method 60 comprises de-noising 64 the second multi-dimensional array, providing a third multi-dimensional array. The de-noising 64 may be performed in any of the described ways, or combinations thereof. As a particular example, the de-noising may be based on using in advance knowledge.

The method 60 comprises applying 65 the inverse of the orthogonal transform to the third multi-dimensional array, providing channel estimates for all branches of the receiver 72.

In an embodiment, the de-noising 64 comprises:
identifying a first set of coefficients of the second multi-dimensional array having magnitudes above a threshold and a second set of coefficients having magnitudes below the threshold, wherein magnitudes above the threshold correspond to samples having significant amounts of desired signal energy, and
keeping the first set of coefficients and setting the second set of coefficients equal to zero or close to zero.

In a variation of the above embodiment, the identifying comprises using a noise power $\sigma^2$ at the receiver 73, wherein the noise power $\sigma^2$ is based on one or more of: temperature measurements, receiver calibration, knowledge of noise figure of receiver chain and a priori knowledge of receiver noise.

In an embodiment, the de-noising 64 comprises identifying a set of coefficients of the second multi-dimensional array based on a priori knowledge comprising one or more of: knowledge of elevation and/or azimuthal direction of arrivals of desired signals at the antenna array 3 and based thereon knowledge of angular sector within which desired signals arrive, and knowledge of geometrical properties of the antenna array 3.

In an embodiment, the antenna array 3 is a linear antenna array comprising co-polarized antennas, and wherein the second dimension comprises the spatial extension of the antennas $5_1, \ldots, 5_N$.

In another embodiment, the antenna array 3 is a planar antenna array comprising co-polarized antennas, and wherein the arranging 62 the obtained matched filter channel estimates in a first multi-dimensional array further comprise a third dimension comprising a second spatial dimension of the antennas $5_1, \ldots, 5_N$.

In an embodiment, in the arranging 62, two neighboring antennas $5_1, \ldots, 5_N$ correspond to two neighboring entries of the first multi-dimensional array.

In an embodiment, the applying 63 an orthogonal transform to the first multi-dimensional array comprises performing an n-dimensional discrete cosine transform or discrete Fourier transform of the first multi-dimensional array, for an antenna array 3 having n–1 spatial dimensions.

In an embodiment, the applying 65 the inverse of the orthogonal transform to the third multi-dimensional array comprises performing an n-dimensional inverse discrete cosine transform or inverse discrete Fourier transform of the third multi-dimensional array for an antenna array 3 having n–1 spatial dimensions.

Although antenna arrays in cellular communication systems are usually located at base stations, e.g. due to their cost and size, it would be possible to use antenna arrays at the (mobile) receiver as well, for example in mobile test equipment. The teachings of the present disclosure may thus, although exemplified in terms of uplink communication, also be applied in downlink direction.

Figure 18:
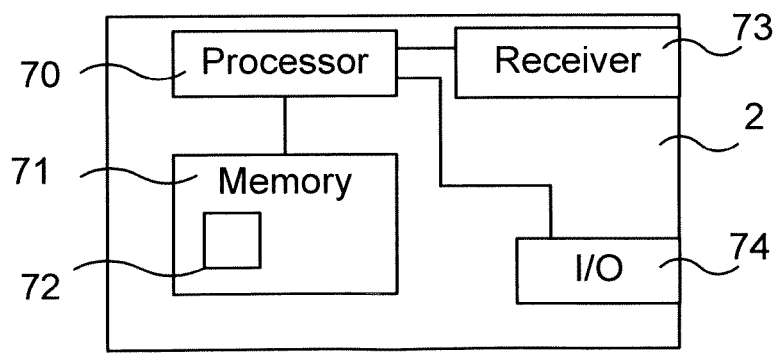
FIG. 18 illustrates schematically a network node and means for implementing embodiments of the method of the present disclosure.

FIG. 18 illustrates schematically a network node and means for implementing embodiments of the method of the present disclosure. The network node 2 comprises a processor 70 comprising any combination of one or more of a central processing unit (CPU), multiprocessor, microcontroller, digital signal processor (DSP), application specific integrated circuit etc. capable of executing software instructions stored in a memory 71, which can thus be a computer program product 71. The processor 70 can be configured to execute any of the various embodiments of the method as have been described, for example in relation to FIG. 17.

The network node 2 comprises a receiver for receiving signals from one or more antenna arrays 3, that it controls. The network node 2 may also comprise input/output devices 74, e.g. an interface, for communicating with other entities, e.g. other radio access nodes and also core network nodes.

The network node 2 may be configurable to control antenna systems comprising one or more antenna arrays, such as the ones that have been described earlier.

A network node 2 is thus provided, which may be configured for estimating a channel. The network node 2 controls, or is configurable to control, an antenna array 3 comprising a number N of antennas $5_1, \ldots, 5_N$ in one or more spatial dimensions. The network node 2 comprises a receiver 72 receiving signals from the antenna array 3, the network node 2 comprises a processor 70 and memory 71, the memory 71 containing instructions executable by the processor 70, whereby the network node 2 is operative to:
- obtain matched filter channel estimates for each sub-carrier and antenna element of a signal received by the antennas $5_1, \ldots, 5_N$, the signal comprising a number K of frequency sub-carriers,
- arrange the obtained matched filter channel estimates in a first multi-dimensional array, wherein time or frequency domain samples of the matched filter channel estimates are arranged along a first dimension and wherein a second dimension is a first spatial dimension of the number N of antennas, wherein the matched filter channel estimates are ordered in the first multi-dimensional array such as to reflect the physical location in space of the antennas $5_1, \ldots, 5_N$,
- apply an orthogonal transform to the first multi-dimensional array, providing a second multi-dimensional array,
- de-noise the second multi-dimensional array, providing a third multi-dimensional array,
- apply the inverse of the orthogonal transform to the third multi-dimensional array, providing channel estimates for all branches of the receiver 72.

In an embodiment, the network node 2 is operative to de-noise by:
- identifying a first set of coefficients of the second multi-dimensional array having magnitudes above a threshold and a second set of coefficients having magnitudes below the threshold, wherein magnitudes above the threshold correspond to samples having significant amounts of desired signal energy, and
- keeping the first set of coefficients and setting the second set of coefficients equal to zero or close to zero.

In a variation of the above embodiment, the network node 2 is operative to identify by using a noise power $\sigma^2$ at the receiver 73, wherein the noise power $\sigma^2$ is based on one or more of: temperature measurements, receiver calibration, knowledge of noise figure of receiver chain and a priori knowledge of receiver noise.

In an embodiment, the network node 2 is operative to de-noise by identifying a set of coefficients of the second multi-dimensional array based on a priori knowledge comprising one or more of: knowledge of elevation and/or azimuthal direction of arrivals of desired signals at the antenna array 3 and based thereon knowledge of angular sector within which desired signals arrive, and knowledge of geometrical properties of the antenna array 3.

In an embodiment, the antenna array 3 is a linear antenna array comprising co-polarized antennas, and wherein the second dimension comprises the spatial extension of the antennas $5_1, \ldots, 5_N$.

In an embodiment, the antenna array 3 is a planar antenna array comprising co-polarized antennas, and wherein the network node 2 is operative to arrange the obtained matched filter channel estimates in a first multi-dimensional array further comprise a third dimension comprising a second spatial dimension of the antennas $5_1, \ldots, 5_N$.

In an embodiment, in a first multi-dimensional array, two neighboring antennas $5_1, \ldots, 5_N$ correspond to two neighboring entries of the first multi-dimensional array.

In an embodiment, the network node 2 is operative to apply an orthogonal transform to the first multi-dimensional array by performing an n-dimensional discrete cosine transform or discrete Fourier transform of the first multi-dimensional array, for an antenna array 3 having n−1 spatial dimensions.

In an embodiment, the network node 2 is operative to apply the inverse of the orthogonal transform to the third multi-dimensional array by performing an n-dimensional inverse discrete cosine transform or inverse discrete Fourier transform of the third multi-dimensional array for an antenna array 3 having n−1 spatial dimensions.

Still with reference to FIG. 18, the memory 71 can be any combination of read and write memory (RAM) and read only memory (ROM). The memory 71 also comprises persistent storage, which, for example, can be any single one or combination of magnetic memory, optical memory, solid state memory or even remotely mounted memory.

A data memory (not illustrated) may also be provided for reading and/or storing data during execution of software instructions in the processor 70. The data memory can be any combination of read and write memory (RAM) and read only memory (ROM).

The present disclosure also encompasses a computer program product 71 comprising a computer program 72 for implementing the methods as described above, and a computer readable means (i.e. storage means) on which the computer program 72 is stored. The computer program product 71 may be any combination of read and write memory (RAM) or read only memory (ROM). The computer program product 71 may also comprise persistent storage, which for example can be any single one or combination of magnetic memory, optical memory or solid state memory.

The present disclosure thus comprise a computer program 71 for a network node 2 for estimating a channel, the network node 2 being configurable to control an antenna array 3 comprising a number N of antennas $5_1, \ldots, 5_N$ in one or more spatial dimensions, and comprising a receiver 72 receiving signals from the antenna array 3. The computer program 72 comprises computer program code, which, when run on the network node 2 causes the network node 2 to:
- obtain matched filter channel estimates for each sub-carrier and antenna of a signal received by the antennas $5_1, \ldots, 5_N$, the signal comprising a number K of frequency sub-carriers,
- arrange the obtained matched filter channel estimates in a first multi-dimensional array, wherein time or frequency domain samples of the matched filter channel estimates are arranged along a first dimension and wherein a second dimension is a first spatial dimension of the number N of antennas, wherein the matched filter channel estimates are ordered in the first multi-dimensional array such as to reflect the physical location in space of the antennas $5_1, \ldots, 5_N$, apply an orthogonal transform to the first multi-dimensional array, providing a second multi-dimensional array, de-noise the second multi-dimensional array, providing a third multi-dimensional array, apply the inverse of the orthogonal transform to the third multi-dimensional array, providing channel estimates for all branches of the receiver 72.

The computer program product, or the memory, thus comprises instructions executable by the processor. Such instructions may be comprised in a computer program, or in one or more software modules or function modules.

Figure 19:
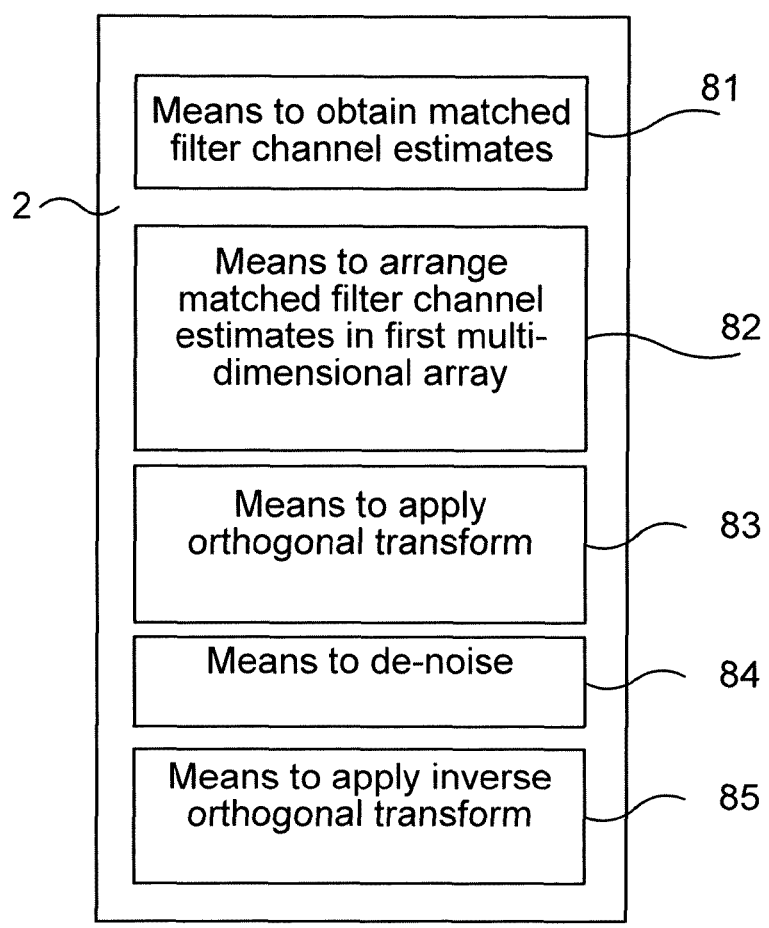
FIG. 19 illustrates a network node comprising function modules/software modules for implementing embodiments of the method of the present disclosure.

An example of an implementation using function modules/software modules is illustrated in FIG. 19, in particular illustrates a network node comprising function modules/software modules for implementing embodiments of the method of the present disclosure. The network node 2 may be used for estimating a channel, the network node 2 controlling an antenna array 3 comprising a number N of antennas $5_1, \ldots, 5_N$ in one or more spatial dimensions and comprising means for receiving signals from the antenna array 3. The network node 2 comprises means 81, for example a first function module, for obtaining matched filter channel estimates for each sub-carrier and antenna of a signal received by the antennas $5_1, \ldots, 5_N$, the signal comprising a number K of frequency sub-carriers.

The network node 2 comprises means 82, for example a second function module, for arranging the obtained matched filter channel estimates in a first multi-dimensional array, wherein time or frequency domain samples of the matched filter channel estimates are arranged along a first dimension and wherein a second dimension is a first spatial dimension of the number N of antennas, wherein the matched filter channel estimates are ordered in the first multi-dimensional array such as to reflect the physical location in space of the antennas $5_1, \ldots, 5_N$.

The network node 2 comprises means 83, for example a third function module, for applying an orthogonal transform to the first multi-dimensional array, providing a second multi-dimensional array.

The network node 2 comprises means 84, for example a fourth function module, for de-noising the second multi-dimensional array, providing a third multi-dimensional array.

The network node 2 comprises means 85, for example a fifth function module, for applying the inverse of the orthogonal transform to the third multi-dimensional array, providing channel estimates for all branches of the receiver 72.

The functional modules 81, 82, 83, 84, 85 can be implemented using software instructions such as computer program executing in a processor and/or using hardware, such as application specific integrated circuits, field programmable gate arrays, discrete logical components etc. Still further means, e.g. function modules, may be provided for performing any of the features and functions that have been described.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a network node for estimating a channel, the network node controlling an antenna array comprising a number N of antennas in one or more spatial dimensions, the network node comprising a receiver receiving signals from the antenna array, the method comprising:
    obtaining matched filter channel estimates for each sub-carrier and antenna of a signal received by the antennas, the signal comprising a number K of frequency sub-carriers,
    arranging the obtained matched filter channel estimates in a first multi-dimensional array, wherein time or frequency domain samples of the matched filter channel estimates are arranged along a first dimension and wherein a second dimension is a first spatial dimension of the number N of antennas, wherein the matched filter channel estimates are ordered in the first multi-dimensional array such as to reflect the physical location in space of the antennas,
    applying an orthogonal transform to the first multi-dimensional array, providing a second multi-dimensional array,
    de-noising the second multi-dimensional array, providing a third multi-dimensional array, and
    applying the inverse of the orthogonal transform to the third multi-dimensional array, providing channel estimates for all branches of the receiver.

2. The method of claim 1, wherein the de-noising comprises:
    identifying a first set of coefficients of the second multi-dimensional array having magnitudes above a threshold and a second set of coefficients having magnitudes below the threshold, wherein magnitudes above the threshold correspond to samples having significant amounts of desired signal energy, and
    keeping the first set of coefficients and setting the second set of coefficients equal to zero or close to zero.

3. The method of claim 2, wherein the identifying comprises using a noise power $\sigma^2$ at the receiver, wherein the noise power $\sigma^2$ is based on one or more of: temperature measurements, receiver calibration, knowledge of noise figure of receiver chain and a priori knowledge of receiver noise.

4. The method of claim 1, wherein the de-noising comprises identifying a set of coefficients of the second multi-dimensional array based on a priori knowledge comprising one or more of: knowledge of elevation and/or azimuthal direction of arrivals of desired signals at the antenna array and based thereon knowledge of angular sector within which desired signals arrive, and knowledge of geometrical properties of the antenna array.

5. The method of claim 1, wherein the antenna array is a linear antenna array comprising co-polarized antennas, and wherein the second dimension comprises the spatial extension of the antennas.

6. The method of claim 1, wherein the antenna array is a planar antenna array comprising co-polarized antennas, and wherein the arranging the obtained matched filter channel estimates in a first multi-dimensional array further comprise a third dimension comprising a second spatial dimension of the antennas.

7. The method of claim 1, wherein in the arranging, two neighboring antennas correspond to two neighboring entries of the first multi-dimensional array.

8. The method of claim 1, wherein the applying an orthogonal transform to the first multi-dimensional array comprises performing an n-dimensional discrete cosine transform or discrete Fourier transform of the first multi-dimensional array, for an antenna array having n−1 spatial dimensions.

9. The method of claim 1, wherein applying the inverse of the orthogonal transform to the third multi-dimensional array comprises performing an n-dimensional inverse discrete cosine transform or inverse discrete Fourier transform of the third multi-dimensional array for an antenna array having n−1 spatial dimensions.

10. A network node for estimating a channel, the network node controlling an antenna array comprising a number N of antennas in one or more spatial dimensions, the network node comprising a receiver receiving signals from the antenna array, the network node comprising a processor and memory, the memory containing instructions executable by the processor, wherein the network node is operative to:
  obtain matched filter channel estimates for each sub-carrier and antenna of a signal received by the antennas, the signal comprising a number K of frequency sub-carriers,
  arrange the obtained matched filter channel estimates in a first multi-dimensional array, wherein time or frequency domain samples of the matched filter channel estimates are arranged along a first dimension and wherein a second dimension is a first spatial dimension of the number N of antennas, wherein the matched filter channel estimates are ordered in the first multi-dimensional array such as to reflect the physical location in space of the antennas,
  apply an orthogonal transform to the first multi-dimensional array, providing a second multi-dimensional array,
  de-noise the second multi-dimensional array, providing a third multi-dimensional array, and
  apply the inverse of the orthogonal transform to the third multi-dimensional array, providing channel estimates for all branches of the receiver.

11. The network node of claim 10, operative to de-noise by:
  identifying a first set of coefficients of the second multi-dimensional array having magnitudes above a threshold and a second set of coefficients having magnitudes below the threshold, wherein magnitudes above the threshold correspond to samples having significant amounts of desired signal energy, and
  keeping the first set of coefficients and setting the second set of coefficients equal to zero or close to zero.

12. The network node of claim 11, operative to identify by using a noise power $\sigma^2$ at the receiver, wherein the noise power $\sigma^2$ is based on one or more of: temperature measurements, receiver calibration, knowledge of noise figure of receiver chain and a priori knowledge of receiver noise.

13. The network node of claim 10, operative to de-noise by identifying a set of coefficients of the second multi-dimensional array based on a priori knowledge comprising one or more of: knowledge of elevation and/or azimuthal direction of arrivals of desired signals at the antenna array and based thereon knowledge of angular sector within which desired signals arrive, and knowledge of geometrical properties of the antenna array.

14. The network node of claim 10, wherein the antenna array is a linear antenna array comprising co-polarized antennas, and wherein the second dimension comprises the spatial extension of the antennas.

15. The network node of claim 10, wherein the antenna array is a planar antenna array comprising co-polarized antennas, and wherein the network node is operative to arrange the obtained matched filter channel estimates in a first multi-dimensional array further comprise a third dimension comprising a second spatial dimension of the antennas.

16. The network node of claim 10, wherein in a first multi-dimensional array, two neighboring antennas correspond to two neighboring entries of the first multi-dimensional array.

17. The network node of claim 10, operative to apply an orthogonal transform to the first multi-dimensional array by performing an n-dimensional discrete cosine transform or discrete Fourier transform of the first multi-dimensional array, for an antenna array having n−1 spatial dimensions.

18. The network node of claim 10, operative to apply the inverse of the orthogonal transform to the third multi-dimensional array by performing an n-dimensional inverse discrete cosine transform or inverse discrete Fourier transform of the third multi-dimensional array for an antenna array having n−1 spatial dimensions.

19. A computer program product comprising a non-transitory computer readable medium storing computer program for a network node for estimating a channel, the network node being configurable to control an antenna array comprising a number N of antennas in one or more spatial dimensions, and comprising a receiver receiving signals from the antenna array, the computer program-comprising computer program code, which, when run on the network node causes the network node to:
  obtain matched filter channel estimates for each sub-carrier and antenna of a signal received by the antennas, the signal comprising a number K of frequency sub-carriers,
  arrange the obtained matched filter channel estimates in a first multi-dimensional array, wherein time or frequency domain samples of the matched filter channel estimates are arranged along a first dimension and wherein a second dimension is a first spatial dimension of the number N of antennas, wherein the matched filter channel estimates are ordered in the first multi-dimensional array such as to reflect the physical location in space of the antennas,
  apply an orthogonal transform to the first multi-dimensional array, providing a second multi-dimensional array,
  de-noise the second multi-dimensional array, providing a third multi-dimensional array, and
  apply the inverse of the orthogonal transform to the third multi-dimensional array, providing channel estimates for all branches of the receiver.

20. The computer program product of claim 19, wherein the computer program code for de-noising the second multi-dimensional array comprises computer program code for:
  identifying a first set of coefficients of the second multi-dimensional array having magnitudes above a threshold and a second set of coefficients having magnitudes below the threshold, wherein magnitudes above the threshold correspond to samples having significant amounts of desired signal energy, and
  keeping the first set of coefficients and setting the second set of coefficients equal to zero or close to zero.

* * * * *